(12) United States Patent
Park et al.

(10) Patent No.: US 12,477,333 B2
(45) Date of Patent: Nov. 18, 2025

(54) COMMUNICATION METHOD AND DEVICE FOR SUPPORTING AUTHENTICATION OF UNMANNED AERIAL VEHICLE IN WIRELESS COMMUNICATION SYSTEM

(71) Applicant: Samsung Electronics Co., Ltd., Suwon-si (KR)

(72) Inventors: Jungshin Park, Suwon-si (KR); Yoonseon Han, Suwon-si (KR); Sangjun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 863 days.

(21) Appl. No.: 17/700,832

(22) Filed: Mar. 22, 2022

(65) Prior Publication Data

US 2022/0312205 A1 Sep. 29, 2022

(30) Foreign Application Priority Data

Mar. 24, 2021 (KR) ........................ 10-2021-0038358

(51) Int. Cl.
*H04W 12/065* (2021.01)
*H04B 7/185* (2006.01)
*H04W 76/10* (2018.01)

(52) U.S. Cl.
CPC ...... *H04W 12/065* (2021.01); *H04B 7/18506* (2013.01); *H04W 76/10* (2018.02)

(58) Field of Classification Search
CPC ....... H04W 76/10; H04W 4/40; H04W 36/12; H04W 76/12; H04W 8/08; H04W 12/06; H04W 84/06; H04W 88/18
See application file for complete search history.

(56) References Cited

U.S. PATENT DOCUMENTS 11,683,679 B2 * 6/2023 Sasi ................... H04W 12/037
370/316
2021/0076202 A1 3/2021 Park et al.

FOREIGN PATENT DOCUMENTS

| KR | 10-2022-0020115 A | 2/2022 |
|---|---|---|
| WO | 2021/020834 A1 | 2/2021 |
| WO | 2021-041214 A1 | 3/2021 |

OTHER PUBLICATIONS

International Search Report dated Jun. 16, 2022, issued in an International Application No. PCT/KR2022/003998.

(Continued)

*Primary Examiner* — Diane D Mizrahi
(74) *Attorney, Agent, or Firm* — Jefferson IP Law, LLP

(57) ABSTRACT

A method and apparatus for supporting authentication of an unmanned aerial vehicle (UAV) in a wireless communication system, the method performed by an access and mobility management function (AMF) in a wireless communication system supporting authentication of an unmanned aerial system (UAS) including at least one of an UAV or an unmanned aerial vehicle controller (UAVC) is provided. The method includes receiving, from the UAS, a packet data unit (PDU) session establishment request including information associated with the UAV for the authentication and connection establishment, selecting, based on the information associated with the UAV, a session management function (SMF) supporting an authentication related function for the UAS, and transmitting, to the selected SMF, the PDU session establishment request.

10 Claims, 13 Drawing Sheets

(56) References Cited

OTHER PUBLICATIONS

3GPP TR 23.755 V2.0.0; 3rd Generation Partnership Project; Technical Specification Group Services and System Aspects; Study on application layer support for Unmanned Aerial Systems (UAS); (Release 17), Mar. 17, 2021.
3GPP TR 33.854 V0.5.0; 3rd Generation Partnership Project; Technical Specification Group Services and System Aspects; Study on security aspects of Unmanned Aerial Systems (UAS) (Release 17), Mar. 17, 2021.
3GPP TR 23.754 V17.0.0; 3rd Generation Partnership Project; Technical Specification Group Services and System Aspects; Study on supporting Unmanned Aerial Systems (UAS) connectivity, Identification and tracking (Release 17), Dec. 17, 2020.
Extended European Search Report dated Jan. 5, 2024, issued in European Patent Application No. 22776060.0.
Korean Office Action dated Jun. 12, 2025, issued in Korean Patent Application No. 10-2021-0038358.

* cited by examiner

COMMUNICATION METHOD AND DEVICE FOR SUPPORTING AUTHENTICATION OF UNMANNED AERIAL VEHICLE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0038358, filed on Mar. 24, 2021, in the Korean Intellectual Property Office, the disclosure of which is incorporated by reference herein in its entirety.

BACKGROUND

1. Field

The disclosure relates to a wireless communication system. More particularly, the disclosure relates to a communication method and device related to an unmanned aerial vehicle (UAV) in a wireless communication system.

2. Description of Related Art

In order to meet the demand for wireless data traffic soaring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra-high frequency bands (mmWave), such as, e.g., 60 Giga Hertz (GHz). To mitigate pathloss on the ultra-high frequency band and increase the reach of radio waves, the following techniques are taken into account for the 5G communication system, beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (COMP), and reception interference cancellation.

There are also other various schemes under development for the 5G system including, e.g., hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC). In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Accordingly, various attempts are being made to apply the 5G communication system to IoT. For example, 5G communication technologies such as sensor networks, M2M, and MTC are implemented by techniques including beamforming, MIMO, and array antenna. Application of a cloud RAN as the big data processing technology described above may be considered to be an example of convergence between the 5G technology and the IoT technology.

As development of mobile communication systems leads to providing diversified services, a need arises for a technique to continuously maintain exchange of information related to a method for transferring authentication and control signals generated due to the mobility of an unmanned aerial vehicle in a mobile communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an efficient communication method and device for supporting authentication of an unmanned aerial vehicle in a wireless communication system.

Additional aspects will be set forth in part in the description which follows and, in part, will be apparent from the description, or may be learned by practice of the presented embodiments.

In accordance with an aspect of the disclosure, a method performed by an access and mobility management function (AMF) in a wireless communication system supporting authentication of an unmanned aerial system (UAS) including at least one of an unmanned aerial vehicle (UAV) or an unmanned aerial vehicle controller (UAVC) is provided. The method includes receiving, from the UAS, a packet data unit (PDU) session establishment request including information associated with the UAV for the authentication and connection establishment, selecting, based on the information associated with the UAV, a session management function (SMF) supporting an authentication related function for the UAS, and transmitting, to the selected SMF, the PDU session establishment request.

In accordance with another aspect of the disclosure, an AMF in a wireless communication system supporting authentication of an UAS including at least one of an UAV or an UAVC is provided. The AMF includes a transceiver, and a processor configured to receive, from the UAS, a packet data unit (PDU) session establishment request including information associated with the UAV for the authentication and connection establishment through the transceiver, select, based on the information associated with the UAV, a SMF supporting an authentication related function for the UAS, and transmit, via the transceiver to the selected SMF, the PDU session establishment request through the transceiver.

In accordance with another aspect of the disclosure, a method performed by a network exposure function (NEF) in a wireless communication system supporting authentication of an UAS including at least one of an UAV or an UAVC is provided. The method includes receiving a mobility-related request for the UAS from an UAS service supplier (USS) or an unmanned aerial traffic management (UTM) requested for flight path authorization of the UAS, identifying a network entity managing first mobility-related information of the UAS based on identification information of the UAS, receiving the first mobility-related information of the UAS from the identified network entity, and transmitting, to the USS or the UTM, second mobility-related information obtained from the first mobility-related information of the UAS, the second mobility-related information being used for the flight path authorization of the UAS.

In accordance with another aspect of the disclosure, a NEF in a wireless communication system supporting authentication of an UAS including at least one of an UAV or an UAVC is provided. The NEF includes a transceiver, and a processor configured to receive, through the transceiver, a mobility-related request for the UAS from an USS or an UTM requested for flight path authorization of the UAS, identify a network entity managing first mobility-related information of the UAS based on identification information of the UAS, receive, through the transceiver, the first mobility-related information of the UAS from the identified network entity, and transmit, to the USS or the UTM through the transceiver, second mobility-related information obtained from the first mobility-related information of the UAS, the second mobility-related information being used for the flight path authorization of the UAS.

Various embodiments include a method for supporting operation of an unmanned aerial system (UAS) through a mobile communication system. Additionally, the UAS may be connected with an unmanned aerial traffic management (UTM) or UAS service supplier (USS) system that plays a role to manage UASs to provide various functions, such as authentication of the UAS, performing a procedure for identifying a valid user through identifying, e.g., security keys of the UAV and UAV controller, providing static or real-time information necessary for unmanned aerial adjustment, permission of a route through identifying the flight route purpose, and forced transfer of authority of the UAS due to emergency. The disclosure includes a method for authenticating UAS terminals (or user equipments (UEs)) through a core network of a mobile communication system and transferring the result to the UTM to reinforce the authentication process and includes a method for receiving additional information during the authentication process to efficiently use a better service for the unmanned aerial vehicle.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
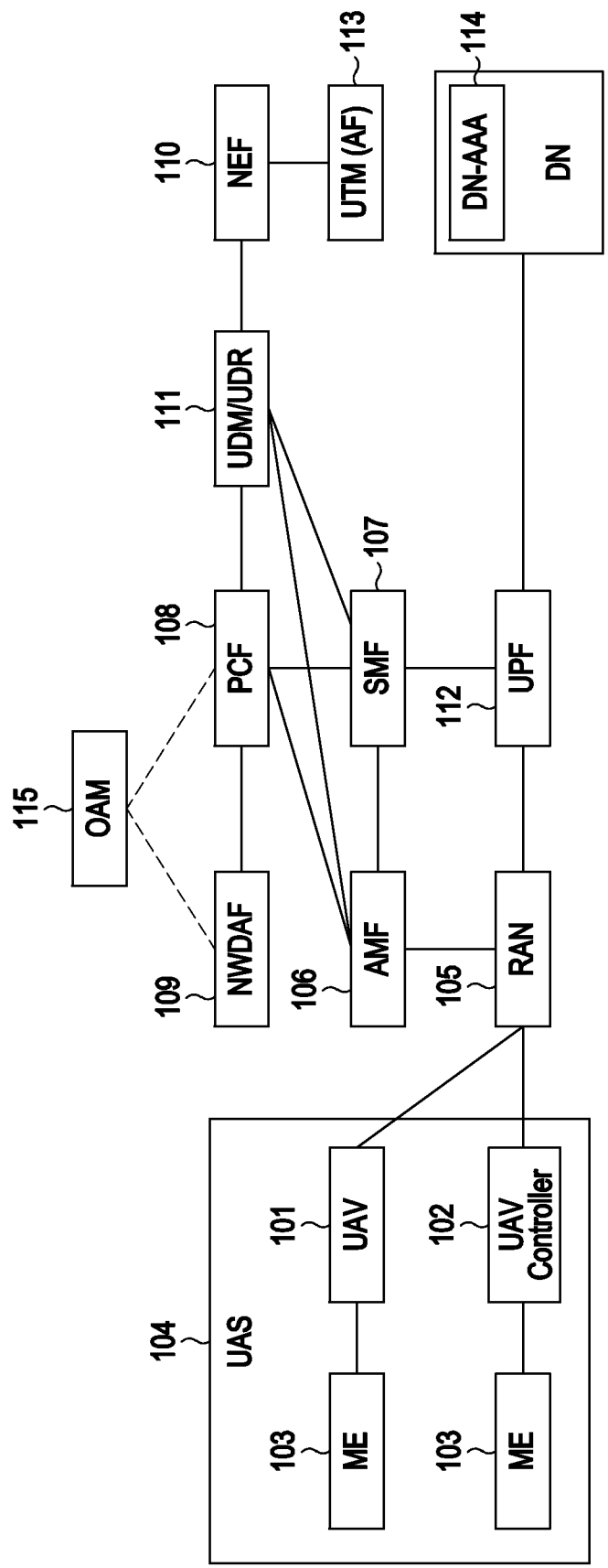
FIG. 1 is a view illustrating a configuration of a wireless communication system for supporting authentication of an unmanned aerial vehicle according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by computer program instructions.

Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments, a " . . . unit" may include one or more processors.

Hereinafter, the base station may be an entity allocating a resource to the terminal and may be at least one of a NodeB, Node B, radio access network (RAN), eNode B (eNB), gNode B (gNB), radio access unit, base station controller, or node on network. The terminal may include UE (user equipment), MS (mobile station), cellular phone, smartphone, computer, or multimedia system capable of performing communication functions. The embodiments of the disclosure may also apply to other communication systems with similar technical background or channel form. Further, embodiments of the disclosure may be modified in such a range as not to significantly depart from the scope of the disclosure under the determination by one of ordinary skill in the art and such modifications may be applicable to other communication systems.

As used herein, terms for identifying access nodes, terms denoting access nodes/network entities or network functions (NFs), terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

The description of embodiments focuses primarily on the radio access network, new RAN (NR), and the core network, packet core (5G system, or 5G core network, or NG core, or next generation core), which are specified by the 3rd generation partnership (3GPP) which is a wireless communication standardization organization. However, the subject matter of the disclosure, or slight changes thereto, may also be applicable to other communication systems that share similar technical backgrounds without departing from the scope of the disclosure, which would readily be appreciated by one of ordinary skill in the art.

For ease of description, some of the terms or names defined in the 3rd generation partnership project (3GPP) standards (standards for 5G, new radio (NR), long-term evolution (LTE), or similar systems) may be used. However, the disclosure is not limited by such terms and names and may be likewise applicable to systems conforming to other standards.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited by the terms, and such terms may be replaced with other terms denoting objects with equivalent technical concept.

Described below are 3GPP standards for a communication method and device for supporting operation of an unmanned aerial vehicle in a wireless communication system according to various embodiments.

The disclosure relates to a wireless communication system and, specifically, to a method for continuously maintaining exchange of authentication-related information that is generated due to the mobility of an unmanned aerial vehicle through exchange of information between an unmanned aerial vehicle (UAV), an unmanned aerial vehicle controller (UAVC), and an unmanned aerial system traffic management (UTM) system for controlling an unmanned aerial system (UAS) including the UAV and the UAVC in a 5G mobile communication system.

In the disclosure, the unmanned aerial vehicle may be various unmanned mobile devices equipped with a communication device, such as drones. Accordingly, it should be noted that the unmanned aerial vehicle of the disclosure is not limited to drones. Currently, in communication methods for operating a drone, no method using a cellular network represented by mobile communication is supported. Most drone operation techniques adopt an operation method through a drone and a drone controller using the protocol provided by the manufacturer through a short-range wireless communication network, such as radio frequency (RF), Bluetooth®, or Wi-Fi®. Therefore, there is a need for research for issues and enhancements related to the mobility of drones and problems that couldn't be predicted for conventional short-range communication networks to control unmanned aerial vehicles in a wireless communication system.

In the disclosure, unmanned aerial vehicle collectively refers to aircraft that may fly along a specific orbit, with no pilot aboard, remotely controlled or autonomously for achieving its purpose, such as hobby or commercial drones controllable within a short distance. Additionally, the unmanned aerial vehicle according to the disclosure is equipped with a communicable device, such as a mobile communication network, Wi-Fi®, or Bluetooth®, and is thus capable of communication between externally located entities, such as the controller of the unmanned aerial vehicle, the short-range communicable unmanned aerial vehicle, and/or a control center.

By their flyable nature, unmanned aerial vehicles may have a different moving form from terminals, e.g., regular smartphones, which are located on the ground in the geographical traveling route. Unmanned aerial vehicles may have different radio wave and communication characteristics due to entry into a communication-unavailable area or high flight altitude. Further, terminal handover may occur at high speed as traveling through a specific area. Thus, a change in the core network may ensue, such as a change in the user plane function (UPF) or session management function (SMF). In such a case, despite the normal flight of the authenticated unmanned aerial vehicle, the authentication system may lose a connection point for authentication due to lack of information connection for whether the unmanned aerial vehicle travels along the route used for authentication of the unmanned aerial vehicle. This issue may cause cancellation of authentication for the unmanned aerial vehicle or inability to support a task, such as changing part of authentication data. Accordingly, a need exists for a method for continuously exchanging information for a connection point for authentication, such as authentication server address or token or the authentication channel related to authentication with external entities related to authentication after the unmanned aerial vehicle is authenticated.

In the disclosure, the terminal may include at least one of an unmanned aerial vehicle (UAV) and an unmanned aerial vehicle controller (UAVC). A form capable of operating an unmanned aerial vehicle, including the UAV and the UAVC, is referred to as a UAS. The terminal may include a mobile equipment (ME). As described above, in the disclosure, the terminal may be referred to by various names, such as UAV, UAVC (or UAV controller), UAS, or UAV/UAVC. Further, the terminal may include a wireless device capable of accessing various wireless networks, such as a 5G-based wireless communication system or a Wi-Fi® network.

The UAVC may refer to a specific physical device, and it may be a form of software running in the cloud or on a specific server. It has a function of accessing a 3GPP network through an LTE (evolved universal mobile telecommunications system (UMTS) terrestrial radio access (E-UTRA), GSM/EDGE radio access network (GERAN), or UTRA), 5G NR, or non-3GPP network and is capable of not only supporting connection with a core network or data network but is also communication between short-range terminals using a side link as defined in the 3GPP. Further, to serve as a terminal following the 3GPP standard, it must support a device and protocol for communication with a base station and core network. With no pilot aboard, the unmanned aerial vehicle may receive control-related signals using a communication network and so be operated.

Various embodiments include a method for supporting operation of an unmanned aerial system (UAS) through a wireless communication system. Referring to the current 3GPP standard document, TS 22.125, a UAS is composed of a UAV and a UAV controller corresponding to a UAVC. Additionally, the UAS may be connected with a UTM or UAS service supplier (USS) system that plays a role to manage UAS(s), and the UTM or USS may provide various functions, such as authentication of the UAS, identification and authentication of the UAV controller, providing static or real-time information necessary for unmanned aerial control, permission through identification of a flight route purpose, and forced transfer of UAS control authority due to emergency. Thus, it is needed to efficiently provide a network service so that the UAV ad the UAV controller constituting the UAS supports network connectivity and devices constituting each UAS is able to be managed via the UTM/USS in the wireless communication system.

During the course of operation of the UAS, the wireless communication system may provide not only connectivity between the UAS terminals or UTM or USS but also additional network services. Representatively, the entity of authenticating the UAS may be the UTM or the USS. In this process, the core network of the wireless communication system may additionally authenticate UAS terminals and transfer the result to the UTM to reinforce the authentication process. Further, during the course of operation of the UAS, the wireless communication system may use the terminal's location information, received from the core network, as well as the location information received from the UAS terminals to thereby enhance the accuracy and reliability for the locations of the UAS terminals.

In the disclosure, the role of the wireless communication system is described in the process of authentication between UAV and UTM terminal. The wireless communication system may perform a registration procedure for a regular terminal, by considering the UAV as a regular terminal and may further perform an authentication procedure on flight-related information with the UTM or USS located outside. In this process, the wireless communication system may intermediate for authentication and may be used to receive authentication information about the unmanned aerial vehicle and provide a better service.

The information received through the external network in the wireless communication system may be utilized to establish the terminal's policy. Here, the policy may be, e.g., a policy related to the mobility of the terminal, session management policy, or billing policy. Further, the UTM/USS may cancel the authentication result or update related data. In this case, if a network entity, e.g., access and mobility management function (AMF), SMF, or policy control function (PCF), is changed in the core network involved in the existing authentication due to the mobility of the terminal, it becomes impossible to transfer the authentication result. The disclosure includes an authentication method for continuously providing transfer of authentication information in the above-described context. Proposed by them are various embodiments for addressing operational issues, such as cancellation of authentication, failure in update, or inability to cancel in the context where authentication of the unmanned aerial vehicle is normally operated.

Currently, the number of terminals using wireless communication networks and the number of services and applications to support them are increasing exponentially. Further, the design and operation of wireless networks and core networks are becoming increasingly sophisticated to enhance the quality of wireless communication systems. In this situation, in addition to terminals simply using voice calls and data services, new types of terminals, such as factories, unmanned aerial vehicles, robots, cars, and airplanes, are emerging. These new types of terminals are expected to steadily increase, and wireless communication systems would also continue to evolve services to effectively support their purposes.

While the purposes and types of various terminals are changing, many terminals in the wireless communication system share radio resources, and in general, the core network is also operated to be shared by many terminals. Since each terminal has a different type and purpose, it has a different interaction with the network depending on the type of operation and the service used. Therefore, the wireless communication system need maintain an optimized configuration by analyzing the purpose and service requirements for each terminal so as to effectively support each type of terminal. Further, to effectively support each terminal and services, it is required to grasp the characteristics of each terminal and to make settings not to influence other terminals and services through optimization and automation of settings and management.

The disclosure proposes schemes for supporting brand-new mobile communication terminals, such as unmanned aerial vehicles, not regular terminals used on the ground represented by conventional smartphones. An unmanned aerial vehicle, given connection through a wireless communication system, may be managed through an authentication server located outside the wireless communication system, such as a UTM or a USS. In such an authentication process, there may be a kind of token or communication channel to manage the authentication of a specific UAV/UAVC between the core network of the wireless communication system and an external authentication server. However, as the unmanned aerial vehicle moves, an internal entity in the core network may be changed, so that authentication-related information may be lost, or the method for transferring the authentication information may not be smoothly performed. Further, in relation to the movement of the terminal (e.g., a UAV), such a context may arise in which a change may be made to the authentication information or policy, such as cancellation of authentication of the terminal (e.g., a UAV). In such a case, when information exchange is impossible between the external authentication server and the wireless communication system, efficient management/control is needed in relation to safety, controllability, and/or regulations related to the operation of the unmanned aerial vehicle. The disclosure provides a communication method and device capable of continuously supporting exchange of information related to authentication between the wireless communication system and the external network, which may maintain exchange of authentication-related information by accepting a change in the core network or mobility of the terminal (e.g., a UAV) to thereby safely operate the unmanned aerial vehicle as per the regulations.

Effects of the disclosure are not limited to the foregoing, and other unmentioned effects would be apparent to one of ordinary skill in the art from the following description.

FIG. 1 is a view illustrating a configuration of a wireless communication system for supporting authentication of an unmanned aerial vehicle according to an embodiment of the disclosure. The wireless communication system of FIG. 1 may support authentication of an unmanned aerial vehicle through the user plane.

Figure 2:
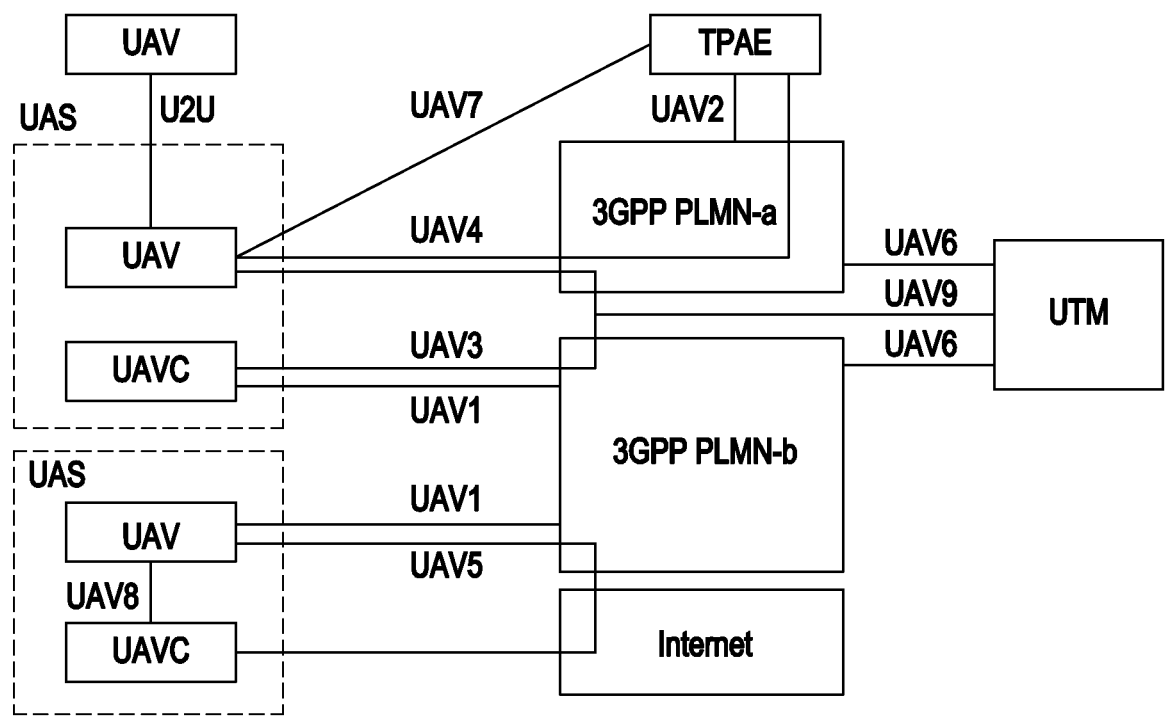
FIG. 2 is a view illustrating a structure for UAS authentication in a wireless communication system for supporting authentication of an unmanned aerial vehicle according to an embodiment of the disclosure.

FIG. 2 is a view illustrating a structure for UAS authentication in a wireless communication system for supporting authentication of an unmanned aerial vehicle according to an embodiment of the disclosure.

Referring to FIG. 1, a system may include a UAS 104 including a mobile equipment (ME) 103 sharing a UAV 101 or a service, the UAV 101, and a UAV controller 102, a radio access network (RAN) 105 supporting wireless communication, an AMF 106, an SMF 107, a PCF 108, a network data analytics function (NWDAF) 109, an NEF 110, a unified data management (UDM) or unified data repository (UDR) 111, a UPF 112, an unmanned aerial vehicle traffic management system (UTM) 113, a DN-AAA server 114, and an operations, administration, and maintenance (OAM) 115 for managing the core network. The configuration and function of each entity are described below. In this case, according to the configuration of the UTM, the UTM 113 and the data network (DN)-authentication, authorization and accounting (AAA) 114 for authenticating/authorizing PDU session establishment may be physically the same server. In the wireless communication system, terminal is the concept generally encompassing ME and UMTS subscriber identity module (MSIM), and the ME 103 may be appreciated as a terminal except for the universal SIM (USIM). FIG. 2 illustrates a reference architecture for UAS authentication under discussion in the 3GPP standard, such as UAV, UAVC, UTM, or third party authorized entity (TPAE).

According to an embodiment, the third party authorized entity (TPAE) may be a police officer, a government worker, or an authenticated UAVC, and the TPAE may request the UAV's identification. According to an embodiment, as shown with UAV3 and UAV5 of FIG. 2, the connection between the UAV and the UAVC is not limited to the mobile communication service provided by a single public land mobile network (PLMN) (PLMN-a or PLMN-b) but may rather be provided through another network or the Internet. The connection between UAVs may be made via a wireless communication system passing through the PLMN, and information may be exchanged between a UAV and another UAV through a short-range communication technique, such as a sidelink (or D2D).

Referring to FIG. 2, UAV1 to UAV9 exemplify reference points for distinguishing the interfaces between the entities in FIG. 2. There may be a UAV6 interface between the 3GPP system and the UTM. Logically, a UAV9 interface may be present between the UAV or UAVC and the UTM. The UAV6 interface and the UAV9 interface may mean logical interfaces. An actual connection may be made using the control plane or user plane.

RAN may denote technology used for wireless communication between the base station and the terminal, such as 5G-NR, E-UTRAN, UTRAN, or GERAN. The terminal may access a base station (e.g., eNB or gNB or integrated access and backhaul (IAB)) supporting wireless technology in the wireless communication system to perform wireless communication and receive a communication service. The base station may transmit the control information or data received from the terminal(s) to another entity in the core network by interworking with the core network and may thus receive configuration for the terminal, transmit/receive data, or perform procedures for management. The terminal may connect to the data network using a technique for using a sidelink, such as proximity service (Prose) performing direction communication between terminals without connection to the base station or a non-3GPP radio access technique, such as Wi-Fi® or Bluetooth®.

The core network exemplified in FIG. 1 may include various entities. According to an embodiment, the core network may include, but is not limited to, devices or network functions described below.

In FIG. 1, the AMF 106 is a device for managing the access and mobility of the terminal and may play a role as a terminal-communication end point for connecting the terminal with other devices in the core network via the RAN 105. As an example, the AMF 106 may perform such functions as terminal registration, connection, reachability, mobility management, access identification/authentication, and mobility event generation. In FIG. 1, the terminal may be an entity 101, 102, 103 or 104, and may be the UAV/UAVC 101 or 102.

In FIG. 1, the SMF 107 may perform a management function of the PDU session of the terminal. For example, the SMF 107 may perform such functions as session management functions of establishing, modifying, or releasing a session and maintaining a tunnel between the UPF 112 and the AN necessary therefor, the functions of allocating and managing an Internet protocol (IP) address of the terminal, address resolution protocol (ARP) proxy functions, selection and control of the user plane, control of traffic processing on the UPF, and billing data gathering control.

In FIG. 1, the policy control function (PCF) 108 plays a role to determine and transfer a policy for access/mobility and session management which is applied to the AMF 106 and the SMF 107. The PCF 108 may manage (or govern) the behavior of the entire network and provide policies to be carried out to network functions (NFs) constituting the control plane. Further, the PCF 108 may access information related to policy making by accessing the unified data repository (UDR) 111.

The network exposure function (NEF) 110 may be responsible for transmitting or receiving an event occurring in the wireless communication system and a supported capability to/from the outside. For example, the NEF 110 may perform functions, such as safe supply of external application information to the core network, conversion of internal/external information, and storing in the UDR 111 and then redistributing the functions received from other NFs.

The unified data management (UDM) and the UDR are independent network functions but, in this embodiment, their functions and roles are used similarly. Thus, for convenience, they are collectively referred to as a UDM/UDR 111. The UDM may perform, e.g., generation of authentication and key agreement (AKA) authentication information for 3GPP security, processing of the user identifier (ID), reverse concealment of the secured user identifier (subscriber concealed ID (SUPI)), management of the list of NFs currently supported by the terminal, and short messaging service (SMS) management. The UDR may perform the functions of storing and providing subscriber information managed by the UDM, structured data for exposure, and application data related to NEF or service.

In FIG. 1, the user plane function (UPF) 112 may play a role to process actual user data and may process packets so that packets generated by the terminal are transferred to an external data network or the data received from the external data network is transferred to the terminal. The UPF 112 may play a role, such as acting as an anchor between radio access technologies, providing connectivity with PDU sessions and external data networks, packet routing and forwarding, packet inspection, application of user plane policy, creating a traffic usage report, or buffering.

In FIG. 1, the network data analytics function (NWDAF) 109 may gather events or information occurring within the network and transfer statistics, predictions, and recommendation information related to specific information to the NF, application function (AF), or OAM 115 using an analysis tool or machine learning tool. The OAM 115 is an entity that detects, in real-time, defects, abnormalities, or failures that may occur during operation in the wireless communication system and informs the operator. For example, the NWDAF 109 may perform functions, such as gathering data from NF/AF/OAM, registering NWDAF services and exposing metadata, and providing network analysis information to NF/AF.

In FIGS. 1 and 2, the UAS traffic management (UTM) or UAS service supplier (USS, hereinafter referred to as a UTM) 113 may play a role to perform traffic management for the unmanned aerial vehicle. Here, traffic may include network traffic and including a role to manage operation of actual physical unmanned aerial vehicles. The UTM 113 may perform such functions as authentication of connection between the UAV 101 and the UAV controller (UAVC) 102, authentication of the configuration of the UAS 104, providing of information for efficient operation of the unmanned aerial vehicle, authentication and route identification of the unmanned aerial vehicle scheduled to fly, identification of the current route and location of the unmanned aerial vehicle, and control of the unmanned aerial vehicle in emergency. It may be the government or public institution who manages the UTM 113, and an agent authorized thereby may operate the UTM 113. In the disclosure, the UTM 113 may serve as an AF or interwork with the AF to provide information related to operation of the unmanned aerial vehicle to the control plane through the NEF in the 3GPP-based wireless communication system. According to an embodiment, the UTM 113 may be configured as a server located in an external network, not an AF, depending on its operation form and, in such a case, the UTM may communicate authentication-related information with the wireless communication system by way of the user plane. In the disclosure, if the UTM 113 is operated by a provider that the operator of the wireless communication system may trust, the UTM 113 may be regarded as a trusted AF or a server located outside.

In the disclosure, the AF and the server may have differences in the path for maintaining the connection. The AF may communicate with the entities located in the wireless communication system, using the control plane, directly or via the NEF 110. As an example, the AF may invoke a service-based interface (SBI) provided by the wireless communication system. In this case, the used interface may be an N5 or N33. A description of the interface may reference the 5G standard. The server may be located outside the network and may communicate with the terminal and entities in the network using the user plane. The interface used in this case may be an N6. However, embodiments are not limited to the above-described interface and, according to an embodiment, a new interface, not the above-described interface, may be used.

Information exchange and control signal exchange between the above-described entities may be performed using procedures, interfaces, and protocols as defined in the 3GPP standards. However, all of the terms used in the disclosure are not limited to the terms and names defined in the 3GPP standards, and may be equally applied to systems and devices conforming to other standards. In describing the embodiments in detail, the communication standards defined in the 3GPP standard documents will be mainly targeted. However, the disclosure is not limited to the communication system defined in the 3GPP standard document, and the embodiments may be applied to other communication systems having a similar technical background, with slight modifications made thereto without significantly departing from the scope of the disclosure. This will be possible by the judgment of one of ordinary skill in the art.

Disclosed are: a communication technique for merging, with an IoT technology, a 5G communication system for supporting a data transmission rate higher than that of a 4G system; and a system therefor. The disclosure can be applied to intelligent services based on 5G communication technology and IoT related technology (for example, smart homes, smart buildings, smart cities, smart cars or connected cars, healthcare, digital education, retail businesses, security and safety related services, and the like) and unmanned aerial vehicles.

Types of terminals receiving a communication service in a wireless communication system gradually increase and may include unmanned aerial vehicles. Due to different characteristics from those of conventional terminals operated on the ground, unmanned aerial vehicles may have quick mobility and reach areas which the ground terminals are difficult to access. Further, unmanned aerial vehicles may be operated for various purposes, such as surveillance, delivery, or firefighting, and their purposes may be changed depending on their flight. Unlike personal terminals, unmanned aerial vehicles change their purpose, route, and controller whenever operated.

Such characteristics of the unmanned aerial vehicle need to consider not only providing a service in the wireless communication system but also matters related to the management and regulations for publicity. To deal with such considerations, an unmanned aerial vehicle necessarily requires authentication through an external server in charge of management and it is required to continuously maintain authentication-related information between an external authentication server and the wireless communication system. By the authentication, the unmanned aerial vehicle may safely be operated.

In the following embodiments, for convenience purposes, the terminal is denoted as a UAV/UAVC. However, it should be noted that in the disclosure, the terminal is not limited to the UAV/UAVC as defined above.

Figure 3:
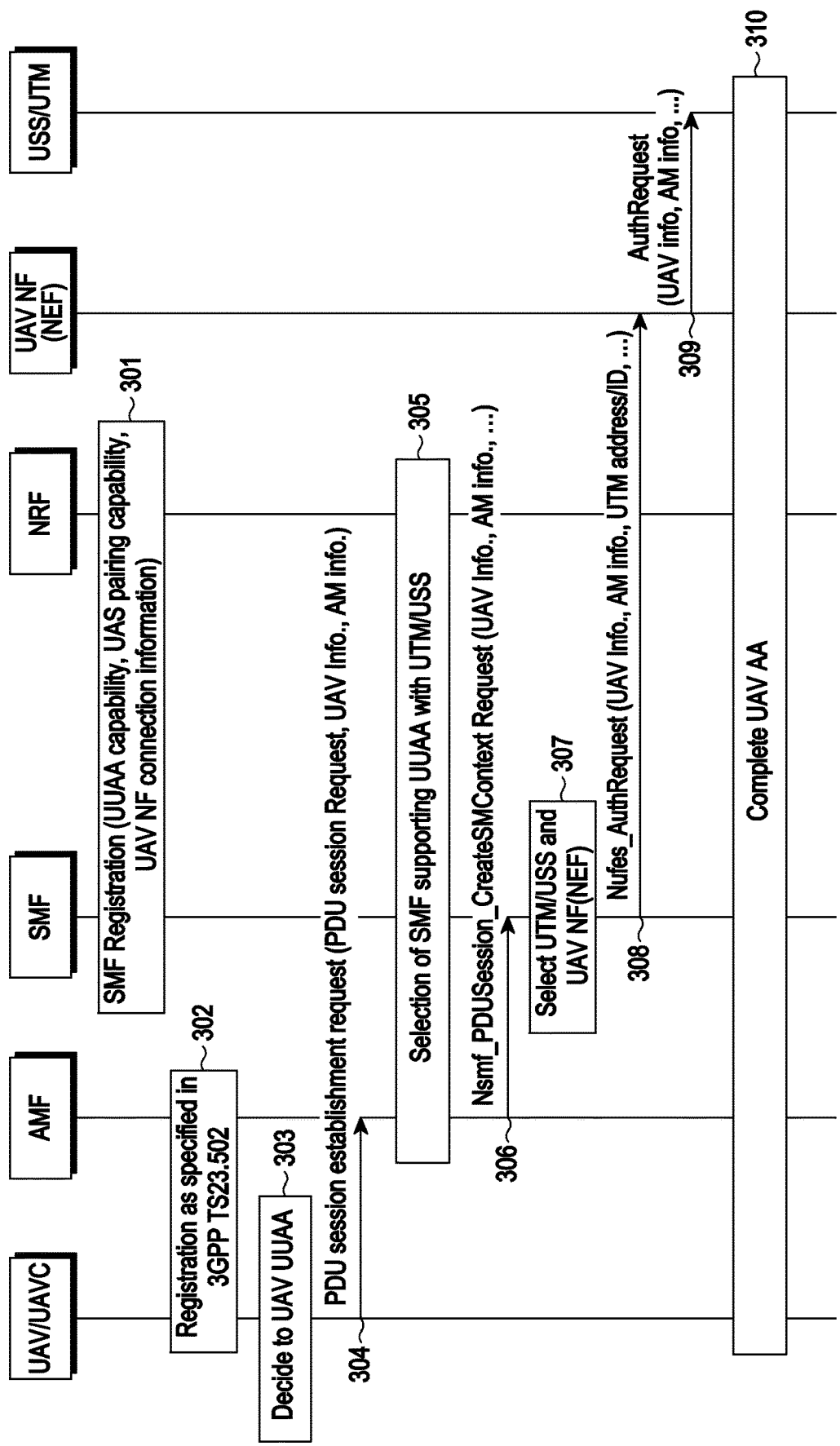
FIG. 3 is a flowchart illustrating a procedure for authenticating a UAV/UAVC through a USS/UTM in a wireless communication system according to an embodiment of the disclosure.

FIG. 3 is a flowchart illustrating a procedure for authenticating a UAV/UAVC through a USS/UTM according to an embodiment of the disclosure. A first embodiment for proposing a UAV-related data transfer method using user plane is described below with reference to FIG. 3.

[First Embodiment]—Method for Transferring Authentication-Related Data for UAV Authentication Like regular terminals using a wireless communication system, a UAV and a UAV controller (UAV/UAVC) using a wireless communication system may be given authentication and authority related to use of the wireless communication system via a normal registration process. The normal registration process is a process for registering terminals, not the UAV/UAVC. The UAV/UAVC may further require authentication with the USS/UTM in addition to the authentication procedure for the regular terminal. In this case, the USS/UTM may be an AF or server located outside the wireless communication system. In the above-described registration process, the core network may support a process in which the UAV/UAVC is normally authenticated through the USS/UTM.

According to an embodiment, to perform an additional procedure for authentication of the UAV/UAVC in the USS/UTM located outside the wireless communication system, it is needed to select an entity for transferring the authentication-related data of the UAV/UAVC through the control plane of the wireless communication system and set a route. In this embodiment, there is included a method for transferring control information to perform authentication with the USS/UTM in additional to authenticating the UAV/UAVC as a regular terminal in the wireless communication system.

The UAV/UAVC may include information about the UAV/UAVC in addition to a PDU session establishment request during the PDU session establishment request to perform external authentication related to aviation. In this case, the UAV/UAVC may use a non-access stratum-session management (NAS-SM) to send a request for establishing a PDU session to the core network, and the PDU session establishment request may be transferred to the SMF through the AMF. In this case, the AMF needs to select an SMF with the capability of performing authentication with the USS/UTM. It may further be considered whether it is possible to establish a data transfer path with a specific USS/UTM during the course of selecting an SMF.

Upon receiving the PDU session establishment request, the AMF may be aware whether the request is a request for establishing a PDU session for the UAV/UAVC through a combination of the type of the container in the NAS message, the presence/absence of a container containing UAV/UAVC-related information, or whether there is a request for a specific data network name (DNN), single network slice selection assistance information (S-NSSAI) or a combination of whether UAV/UAVC information is included in the terminal's subscription information. According to an embodiment, the SMF selection process for processing the request by the AMF receiving the PDU session establishment request from the UAV/UAVC is shown in FIG. 3. In the disclosure, a method for transferring, to the USS/UTM, UAV/UAVC-related authentication data transferred from the UAV/UAVC for authentication of the UAV/UAVC and additional data related to UAV/UAVC operation is described in detail with reference to FIG. 3.

Referring to FIG. 3, in operation 301, in the SMF executed or initialized state, the SMF registers related information with the network repository function (NRF) supporting a service discovery function so as to allow another NF, e.g., AMF, to discover/detect the SMF. The information registered with the NRF may include at least one of information for NF management defined in the 3GPP standard, e.g., NF instance identifier, NF address or fully qualified domain name (FQDN), and supported service name. In this process, the disclosure may further include whether the SMF supports an authentication-related service of the UAV/UAVC and list information about the connected USS/UTM addresses. For example, at least one of whether the SMF supports authentication with an external server through the SMF and UAV NF (NEF) for authentication of the UAV/UAVC (UUAA capability), whether the SMF supports closed communication with an authenticated terminal requested by a specific UAVC or UTM (UAS pairing capability), and address or name list of USS/UTM connected with the SMF (UAV NF information) may be stored in the NF profile of the corresponding SMF and registered with the NRF.

In operation 302, the UAV/UAVC performs a registration procedure in the wireless communication system. This process may be performed according to the terminal's normal registration procedure as defined in the 3GPP standard (TS 23.502).

In operation 303, the UAV/UAVC determines whether to perform authentication (e.g., UUAA) through the USS/UTM. The UUAA means a process for the UAV/UAVC to receive flight-related authentication through the UTM/USS.

In operation 304, the UAV/UAVC transmits a PDU session establishment request for authentication and connection establishment through the USS/UTM to the AMF. The PDU session establishment request may be transferred using a NAS message. The NAS message used in this case may be a NAS-SM. In addition, in operation 304, the UAV/UAVC may include at least one of UAV operation-related information, e.g., the serial number of the UAV, the UAV unique identifier, the identifier/network address of the USS/UTM managing the UAV/UAVC, flight time and route, and whether additional authentication is required. Further, in operation 304, according to an embodiment, the UAV/UAVC may additionally include information related to mobility restriction transferred in operation 302 in the NAS message and transfer it to the AMF.

In operation 305, the AMF receiving the PDU session establishment request from the UAV/UAVC selects an SMF for processing the request. In this case, the disclosure may select an SMF using the information additionally included in operation 304, rather than selecting an SMF by referring to the previously requested S-NSSAI and DNN alone. The AMF may compare the information with the SMF-related information registered in operation 301 and discover an SMF that may meet the PDU session establishment request through the NRF. For example, the AMF may perform an SMF where the UAV/UAVC is able to perform an additional authentication-related function with the USS/UTM or an external AF through whether the additional authentication is needed. Further, the selected SMF may be an SMF supporting the USS UAV authentication/authorization (UUAA) to allow the UAV/UAVC to be registered and permitted with the USS/UTM through the wireless communication system. Further, the AMF may select an SMF supporting the corresponding USS/UTM (or the AF's address) more specifically, by using the address of the requested USS/UTM.

In operation 306, if selection of an SMF to process the PDU session request is complete, the AMF transfers the NAS-SM message received from the UAV/UAVC in operation 304 to the selected SMF.

In operation 307, the SMF receiving the PDU session establishment request from the AMF determines whether to perform additional authentication on the UAV/UAVC with the USS/UTM based on the UAV-related information additionally transferred from the UAV/UAVC and selects a UAV NF (NEF) for performing authentication on the UAV/UAVC with the USS/UTM using the address information about the USS/UTM.

In operation 308, the SMF performs authentication with an external USS/UTM (or AF) according to the content of the message received from the UAV/UAVC. In this case, the SMF transfers the mobility-related information and authentication-related information, received from the UAV/UAVC through the UAV NF (or NEF), to the NEF. In this case, the UAV NF may transfer authentication-related information for additional authentication with the external entity, mobility restriction-related information, USS/UTM identifier, or network address, and the service used at this time may be performed by invoking a new service interface provided by the NEF.

In operation 309, the NEF performs an authentication procedure on the UAV/UAVC with the USS/UTM (or AF) located outside, based on the information received from the SMF in operation 308. If additional information is needed in this process, exchange of an additional message with the UAV/UAVC may be performed using the NAS-SM message through the SMF.

In operation 310, the USS/UTM performs authentication on the UAV/UAVC based on the received USS/UTM and responds to the UAV NF (NEF), with the authentication result. The response result transferred to the UAV NF (NEF) may be transferred to the SMF and the UAV/UAVC (UAV authentication/authorization (AA)).

[Second Embodiment]—Method for Reselection of Authentication-Related SMF for UAV/UAVC Authentication A UAV/UAVC using a 5G-based wireless communication system may be given authentication and authority related to use of the wireless communication system via a normal registration process. The normal registration process is a process for registering terminals, not the UAV/UAVC. The UAV/UAVC may further require authentication with the USS/UTM in addition to the authentication procedure for the regular terminal. In this case, the USS/UTM may be an AF or server located outside the wireless communication system. In the above-described registration process, the core network may support a process in which the UAV/UAVC is normally authenticated through the USS/UTM.

According to an embodiment, to perform an additional procedure for authentication of the UAV/UAVC in the USS/UTM located outside the wireless communication system, it is needed to select an entity for transferring the authentication-related data of the UAV/UAVC through the control plane of the wireless communication system and set a route. In this embodiment, there is included a method for transferring control information to perform authentication with the USS/UTM in additional to authenticating the UAV/UAVC as a regular terminal in the wireless communication system.

The UAV/UAVC may include information about the UAV/UAVC in addition to a PDU session establishment request during the PDU session establishment request to perform external authentication related to aviation. In this case, the UAV/UAVC may use a NAS-SM to send a request for establishing a PDU session to the core network of the wireless communication system, and the PDU session establishment request may be transferred to the SMF through the AMF. In this case, the AMF needs to select an SMF with the capability of performing authentication with the USS/UTM. It may further be considered whether it is possible to establish a data transfer path with a specific USS/UTM during the course of selecting an SMF.

Upon receiving the PDU session establishment request, the AMF may be aware whether the request is a request for establishing a PDU session for the UAV/UAVC through a combination of the type of the container in the NAS message, the presence/absence of a container containing UAV/UAVC-related information, or whether there is a request for a specific DNN, S-NSSAI or a combination of whether UAV/UAVC information is included in the terminal's subscription information.

Figure 4A:
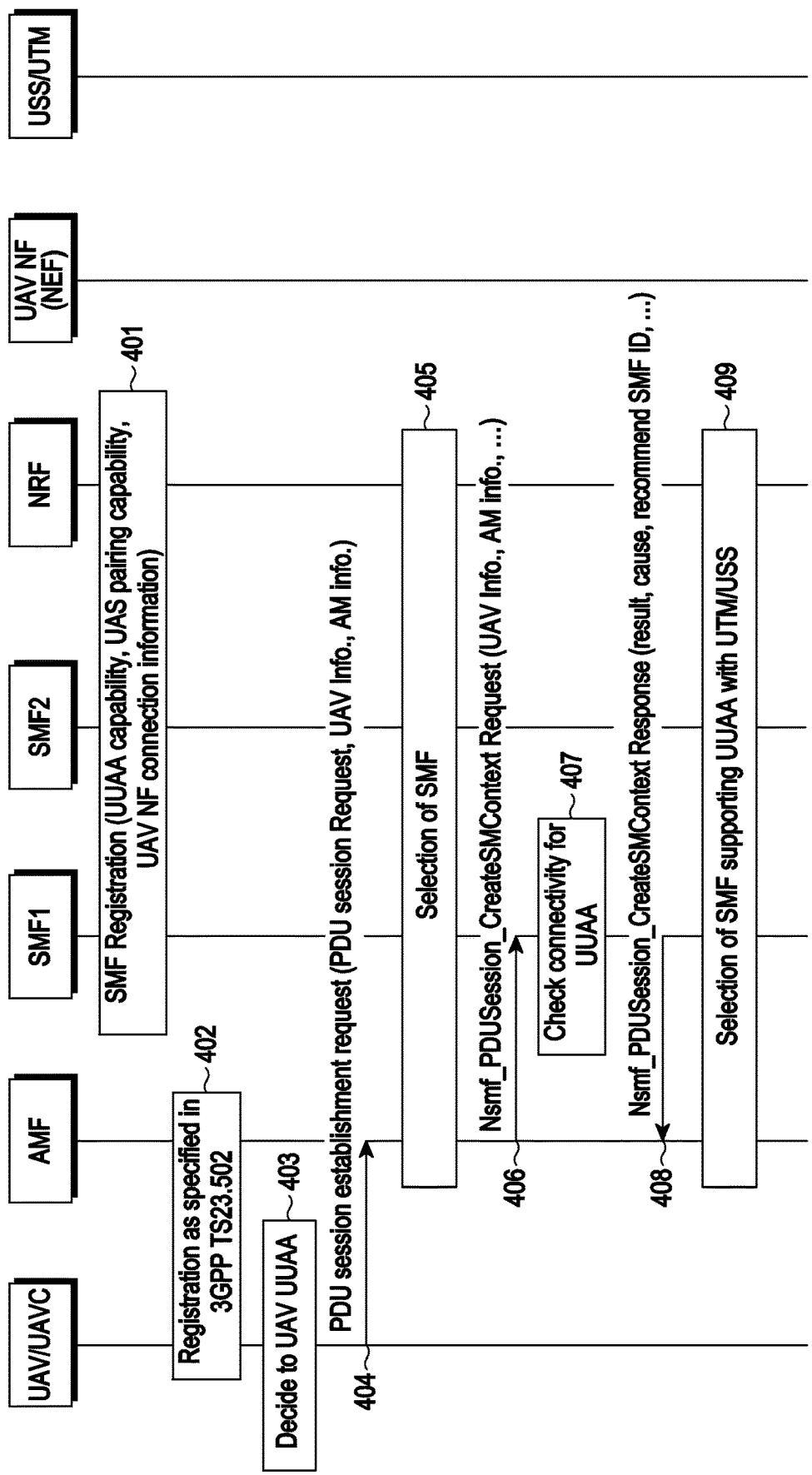
FIGS. 4A and 4B are flowcharts illustrating a UAV/UAVC authentication-related procedure including reselection of an SMF in a wireless communication system according to various embodiments of the disclosure.
Figure 4B:
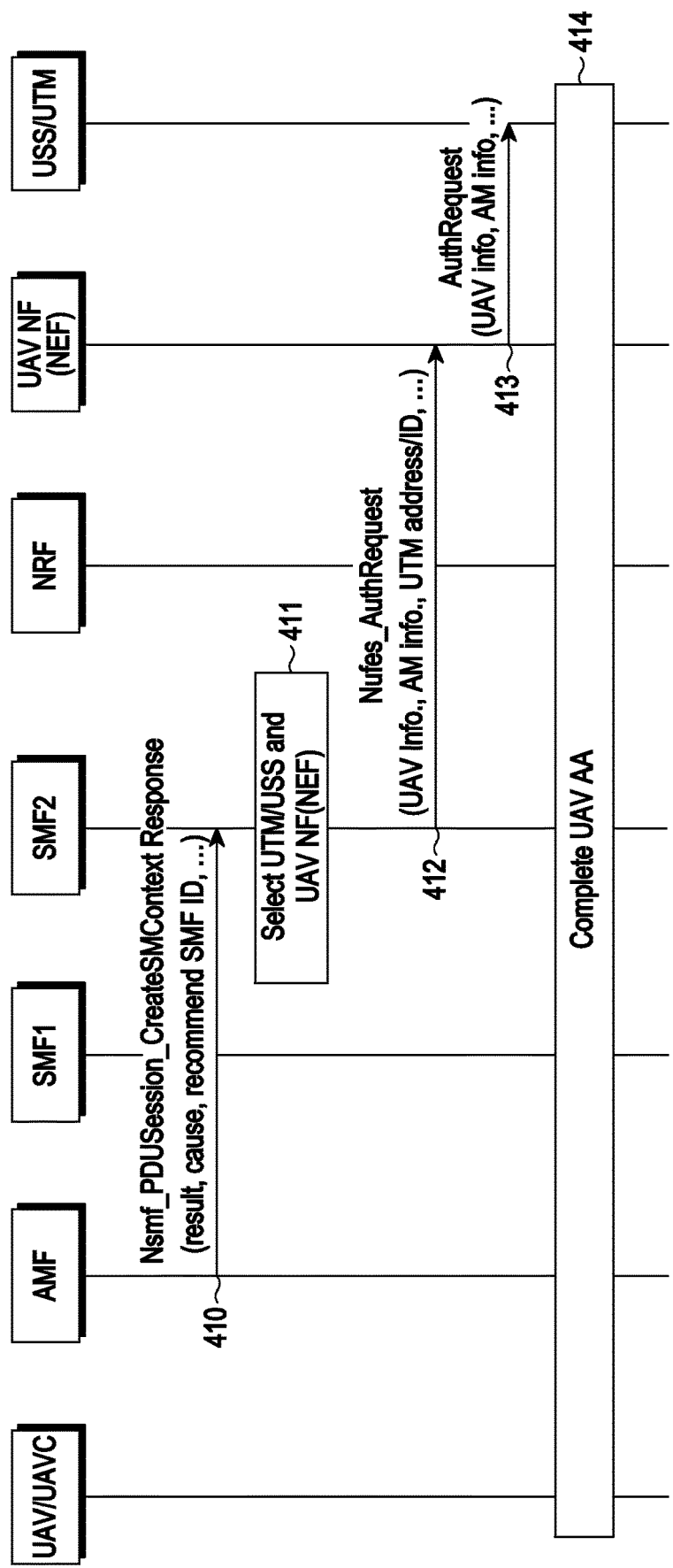

According to an embodiment, the SMF selection process for processing the request by the AMF receiving the PDU session establishment request from the UAV/UAVC is shown in FIGS. 4A and 4B. In this case, if incapable of processing the information transferred from the UAV/UAVC, the AMF is unable to select a precise SMF. In this case, the AMF may select an SMF according to an SMF selection method as defined in the 3GPP standard. For example, the AMF selects an SMF based on the S-NSSAI, DNN, and terminal location information. The SMF, receiving the NAS-SM message from the AMF, may be aware that the terminal is the UAV/UAVC in the process of establishing a PDU session and be aware that additional authentication with the UTM/USS is required. The SMF determines whether it is able to support additional authentication with the USS/UTM and whether there is connectivity with the requested USS/UTM. In this process, if the corresponding SMF is unable to support additional authentication with a specific USS/UTM, the SMF may transfer a failure message indicating that the SM context of the PDU session may not be generated to the AMF requesting the PDU session establishment. The SMF may further include at least one of non-support of additional authentication with an external entity, information indicating that it is impossible to connect with a specific USS/UTM, and recommended SMF instance ID/address FQDN information, as the reason for failure to generate an SM context, in the failure message and transfer it. In the disclosure, a method for selecting an appropriate SMF to transfer, to the USS/UTM, UAV/UAVC-related authentication data transferred from the UAV/UAVC for authentication of the UAV/UAVC and additional data related to UAV/UAVC operation is described in detail with reference to FIGS. 4A and 4B.

FIGS. 4A and 4B are flowcharts illustrating a UAV/UAVC authentication-related procedure including reselection of an SMF according to various embodiments of the disclosure.

Referring to FIGS. 4A and 4B, in operation 401, in the SMF executed or initialized state, the corresponding SMF (e.g., SMF1 or SMF2) registers related information with the NRF supporting a service discovery function so as to allow another NF, e.g., AMF, to discover/detect the SMF. The information registered with the NRF may include at least one of information for NF management defined in the 3GPP standard, e.g., NF instance identifier, NF address or FQDN, and supported service name. In this process, the disclosure may further include whether the SMF (e.g., SMF1 or SMF2) supports an authentication-related service of the UAV/UAVC and list information about the connected USS/UTM addresses. For example, at least one of whether the SMF supports authentication with an external server through the SMF and UAV NF (NEF) for authentication of the UAV/UAVC (UUAA capability), whether the SMF supports closed communication with an authenticated terminal requested by a specific UAVC or UTM (UAS pairing capability), and address or name list of UTM/USS connected with the SMF (UAV NF information) may be stored in the NF profile of the corresponding SMF and registered with the NRF.

In operation 402, the UAV/UAVC performs a registration procedure in the wireless communication system. This process may be performed according to the terminal's normal registration procedure as defined in the 3GPP standard (TS 23.502).

In operation 403, the UAV/UAVC determines whether to perform authentication (e.g., UUAA) through the USS/UTM.

In operation 404, the UAV/UAVC transmits, to the AMF, a PDU session establishment request for establishing connection and authentication through the USS/UTM. The PDU session establishment request may be transferred using a NAS message. The NAS message used in this case may be a NAS-SM. In addition, in operation 404, the UAV/UAVC may include at least one of UAV operation-related information, e.g., the serial number of the UAV, the UAV unique identifier, the identifier/network address of the USS/UTM managing the UAV/UAVC, flight time and route, and whether additional authentication is required. Further, in operation 404, according to an embodiment, the UAV/UAVC may additionally include information related to mobility restriction transferred in operation 402 in the NAS message and transfer it.

In operation 405, the AMF receiving the PDU session establishment request from the UAV/UAVC selects an SMF for processing the request. The SMF selection method may follow the method defined in the 3GPP standard. As an example, position information about S-NSSAI, DNN, and UAV/UAVC may be considered.

In operation 406, if selection of an SMF to process the PDU session request is complete, the AMF transfers the NAS-SM message received from the UAV/UAVC in operation 404 to the selected SMF (e.g., SMF1).

In operation 407, SMF1 receiving the PDU session establishment request of the terminal from the AMF determines whether the PDU session establishment request is a request processable using whether additional authentication with an external entity (USS/UTM) is performed and the address of the USS/UTM, using the information additionally transferred from the UAV/UAVC in operation 402. In other words, the SMF checks connection for the UUAA. If the request is one that can be processed by the SMF, the process may go to operation 411. If the request is not processable, the process may go to operation 408.

In operation 408, if the request is not processable, SMF1 may transfer, to the AMF, a notification that the PDU session generation request is not processable and may additionally transfer at least one of non-support of additional authentication with an external entity, information of incapability of connecting with a specific UTM/USS, recommended SMF instance ID/address, and FQDN information.

In operation 409, the AMF performs reselection of an SMF using at least one of non-support of additional authentication with an external entity, information of incapability of connecting with a specific UTM/USS, recommended SMF instance ID/address, and FQDN information, received from the SMF in operation 408. In this case, the disclosure may select an SMF using the information additionally included in operation 408, rather than selecting an SMF by referring to the previously requested S-NSSAI and DNN alone. The AMF may compare the information with the SMF-related information registered in operation 401 and discover an SMF that may meet the PDU session establishment request through the NRF. For example, the AMF may perform an SMF where the UAV/UAVC is able to perform an additional authentication-related function with the USS/UTM or an external AF through whether the additional authentication is needed. Further, the selected SMF may be an SMF supporting the USS UAV authentication/authorization (UUAA) to allow the UAV/UAVC to be registered and permitted with the USS/UTM through the wireless communication system. Further, the AMF may select an SMF supporting the corresponding USS/UTM (or the AF's address) more specifically, by using the address of the requested USS/UTM.

In operation 410, if selection of an SMF to process the PDU session request is complete, the AMF transfers the NAS-SM message received from the UAV/UAVC in operation 404 to the selected SMF (e.g., SMF2).

In operation 411, the SMF receiving the PDU session establishment request from the AMF determines whether to perform additional authentication on the UAV/UAVC with the USS/UTM based on the UAV/UAVC-related information additionally transferred from the UAV/UAVC and selects a UAV NF for performing authentication on the UAV/UAVC with the USS/UTM using the address information about the USS/UTM.

In operation 412, SMF2 performs authentication with an external UTM (or AF) according to the content of the message received from the UAV/UAVC. In this case, SMF2 transfers the mobility-related information and authentication-related information, received from the UAV/UAVC through the UAV NF (or NEF), to the NEF. In this case, the UAV NF may transfer authentication-related information for additional authentication with the external entity, mobility restriction-related information, USS/UTM identifier, or network address, and the service used at this time may be performed by invoking a new service interface provided by the NEF.

In operation 413, the NEF performs an authentication procedure on the UAV/UAVC with the USS/UTM (or AF) located outside, based on the information received from SMF2 in operation 412. If additional information is needed in this process, exchange of an additional message with the UAV/UAVC may be performed using the NAS-SM message through the SMF.

In operation 414, the USS/UTM performs authentication on the UAV/UAVC based on the received USS/UTM and responds to the UAV NF (NEF), with the authentication result. The response result transferred to the UAV NF (NEF) may be transferred to the SMF and the UAV/UAVC.

[Third Embodiment]—Method for Requesting Terminal Mobility-Related Information for Unmanned Aerial Vehicle Route Authentication from AMF The disclosure includes a method for the USS/UTM to receive information about a service area of a wireless communication system and an area in which communication is impossible, such as a service restricted area and a service prohibited area, in relation to the determination of a flight route of the UAV. If the UAV moves to a communication service-unavailable area, it is unable to receive control information and may thus be impossible to operate. There is also included a method for identifying radio access-related information suited for the purpose of operation of the UAV by additionally grasping the radio access technology (RAT) type and frequency band. The method of the disclosure is described in detail with reference to FIG. 5.

Figure 5:
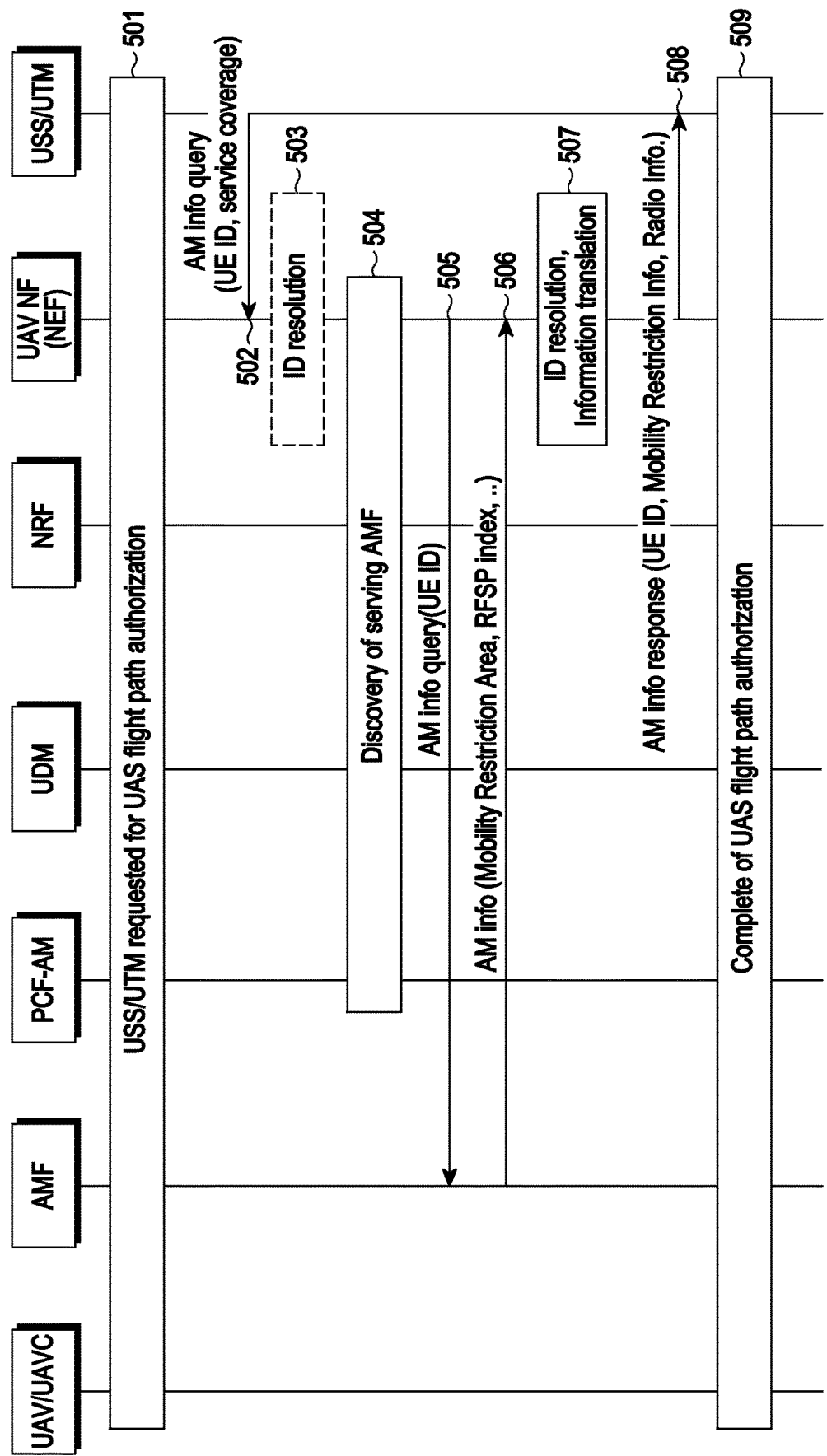
FIG. 5 is a flowchart illustrating a procedure in which a USS/UTM requests mobility-related information about a UAV/UAVC through an AMF in a wireless communication system according to an embodiment of the disclosure.

FIG. 5 is a flowchart illustrating a procedure in which a USS/UTM requests mobility-related information about a UAV/UAVC through an AMF in a wireless communication system according to an embodiment of the disclosure.

Referring to FIG. 5, in operation 501, the USS/UTM receives a request related to setup of a flight route of the UAV from, e.g., the UAV/UAVC.

In operation 502, the USS/UTM requests mobility-related information about the UAV/UAVC from the UAV NF or NEF of the wireless communication system to request information related to the service area of a specific UAV/UAVC to grasp the communication-impossible area to set up a flight route of the UAV. Additionally, the USS/UTM may transfer a predicted traveling route or flight area of the UAV/UAVC, as an optional factor, optionally transferring information for assisting the target area of the request to a specific area. The USS/UTM may have an identifier (e.g., civil aviation authority (CAA) level ID) that it manages on its own, or an external identifier (e.g., External UE ID) that is identifiable in the wireless communication system, according to the method for identifying the UAV/UAVC. In the disclosure, the two identifiers both may be allowed as identifiers of the UAV/UAVC, and when the CAA level ID is used, operation 503 is performed. In this case, the UAV/UAVC requesting a flight route may request flight routes for a plurality of UAVs/UAVCs, e.g., in the form of a list, sequentially or simultaneously.

In operation 503, the UAV NF (or NEF) receiving a request for mobility information about the specific UAV/UAVC from the UTM/USS changes/converts the identifier of the UAV/UAVC to an identifier available in the wireless communication system according to the type of the received identifier. For example, when the CAA level ID is included in the request, the identifier may be changed/converts to an internal identifier (Internal UE ID or SUPI) in the wireless communication system. Even when the external identifier is used, it may be changed to the internal identifier. If the AMF to which the UAV NF transfers the message is able to recognize the external identifier, operation 503 may be omitted.

In operation 504, the UAV NF (or NEF) discovers the AMF that is currently managing the UAV/UAVC through the NRF or UDM, using the UAV/UAVC changed in operation 503. The service used at this time may be Nnrf_NF-Discovery or Nudm_UECM. For a basic description of the service, refer to the TS 23.502 standard.

In operation 505, the UAV NF, discovering the AMF currently managing the UAV/UAVC through operation 504, requests mobility-related information about the UAV/UAVC from the AMF. The service used at this time may be Namf_EventExposure or a newly defined service. For a basic description of the service, refer to the TS 23.502 standard.

In operation 506, in response, the AMF, receiving the request for mobility-related information from the UAV NF (or NEF), transfers at least one piece of mobility-related information, such as mobility-restricted area and currently assigned radio access technology (RAT)/frequency selection priority (RFSP) index, to the UAV NF. Although the mobility-restricted area differs depending on the network management policy, information may be represented as a list of service-prohibited areas (e.g., a blacklist type) or a list of service-permitted areas (e.g., a whitelist type).

In operation 507, the UAV NF, receiving the mobility-related information from the AMF, may additionally convert information, e.g., tracking area ID (TAI) which is area information represented in the wireless communication system, into local area information. Further, it is possible to convert the RAT type and frequency band currently used by the terminal based on the currently assigned RSFP index information.

In operation 508, the UAV NF transfers the information converted in operation 507 to the UTM/USS.

In operation 509, the UTM/USS finishes the flight route setup of the UAV using the mobility-related information about the UAV/UAVC received from the wireless communication system.

[Fourth Embodiment]—Method for Requesting Terminal Mobility-Related Information for Unmanned Aerial Vehicle Route Authentication from PCF The disclosure includes a method for the USS/UTM to receive information about a service area of a wireless communication system and an area in which communication is impossible, such as a service restricted area and a service prohibited area, in relation to the determination of a flight route of the UAV. If the UAV moves to a communication service-unavailable area, it is unable to receive control information and may thus be impossible to operate. There is also included a method for identifying radio access-related information suited for the purpose of operation of the UAV by additionally grasping the radio access technology (RAT) type and frequency band. This is described in detail with reference to FIG. 6. In the disclosure, the PCF in charge of the policy related to the terminal's mobility is denoted as PCF-access and mobility (AM), and the PCF in charge of the policy related to PDU session is denoted as PCF-session management (SM).

Figure 6:
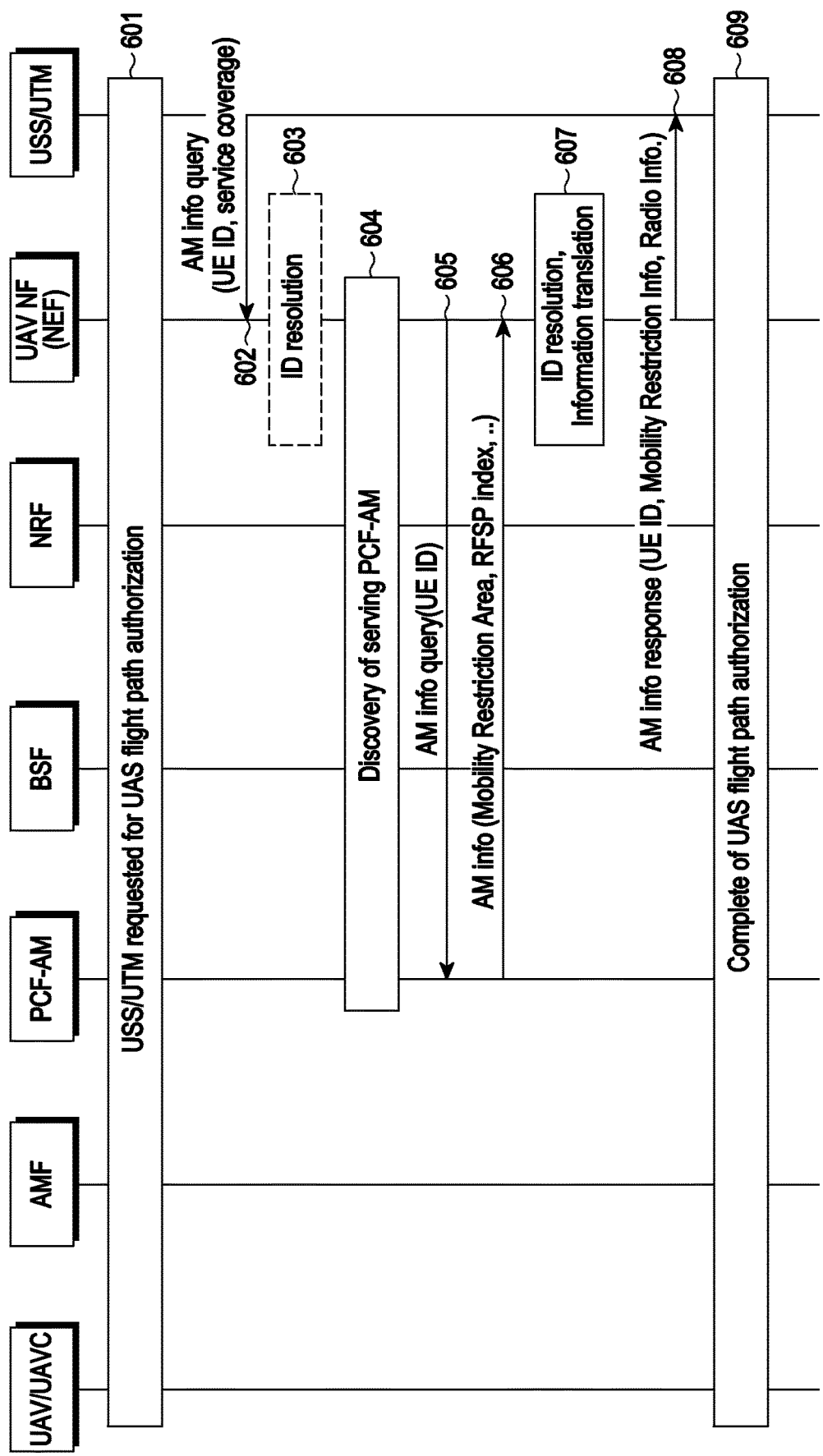
FIG. 6 is a flowchart illustrating a procedure in which a USS/UTM requests mobility-related information about a UAV/UAVC through a policy control function-access and mobility (PCF-AM) in a wireless communication system according to an embodiment of the disclosure.

FIG. 6 is a flowchart illustrating a procedure in which a USS/UTM requests mobility-related information about a UAV/UAVC through a PCF-AM in a wireless communication system according to an embodiment of the disclosure.

Referring to FIG. 6, in operation 601, the USS/UTM receives a request related to setup of a flight route of the UAV from, e.g., the UAV/UAVC.

In operation 602, the USS/UTM requests mobility-related information about the UAV/UAVC, using the UAV NF or NEF of the wireless communication system to request information related to the service area of a specific UAV/UAVC to grasp the communication-impossible area to set up a flight route of the unmanned aerial vehicle. Additionally, the USS/UTM may transfer a predicted traveling route or flight area of the UAV/UAVC, as an optional factor, optionally transferring information for assisting the target area of the request to a specific area. The USS/UTM may have an identifier (e.g., CAA level ID) that it manages on its own, or an external identifier (e.g., External UE ID) that is identifiable in the wireless communication system, according to the method for identifying the UAV/UAVC. In the disclosure, the two identifiers both may be allowed as identifiers of the UAV/UAVC, and when the CAA level ID is used, operation 603 is performed. In this case, the UAV/UAVC requesting a flight route may request flight routes for a plurality of UAVs/UAVCs, e.g., in the form of a list, sequentially or simultaneously.

In operation 603, the UAV NF (or NEF) receiving a request for mobility information about the specific UAV/UAVC from the UTM/USS changes the identifier of the UAV/UAVC to an identifier available in the wireless communication system according to the type of the received identifier. For example, when the CAA level ID is included in the request, the identifier may be changed to an internal identifier (Internal UE ID or SUPI) in the wireless communication system. Even when the external identifier is used, it may be changed to the internal identifier. If the AMF to which the UAV NF transfers the message is able to recognize the external identifier, operation 603 may be omitted.

In operation 604, the UAV NF (or NEF) discovers the PCF-AM that is currently managing the UAV/UAVC through the NRF or UDM, using the UAV/UAVC changed in operation 603. The service used at this time may be Nnrf_NFDiscovery or Nbsf_Management. For a basic description of the service, refer to the TS 23.502 standard.

In operation 605, the UAV NF, discovering the PCF-AM currently managing the UAV/UAVC through operation 604, requests mobility-related information about the UAV/UAVC from the PCF-AM. The service used at this time may be Namf_EventExposure or a newly defined service.

In operation 606, in response, the PCF-AM, receiving the request for mobility-related information from the UAV NF (or NEF), transfers at least one piece of mobility-related information, such as mobility-restricted area and currently assigned RFSP index, to the UAV NF. Although the mobility-restricted area differs depending on the network management policy, information may be represented as a list of service-prohibited areas (e.g., a blacklist type) or a list of service-permitted areas (e.g., a whitelist type).

In operation 607, the UAV NF, receiving the mobility-related information from the PCF-AM, may additionally convert information, e.g., TAI which is area information represented in the wireless communication system, into local area information. Further, it is possible to convert the RAT type and frequency band currently used by the terminal based on the currently assigned RSFP index information.

In operation 608, the UAV NF transfers the information converted in operation 607 to the UTM/USS.

In operation 609, the UTM/USS finishes the flight route setup of the UAV using the mobility-related information about the UAV/UAVC received from the wireless communication system.

[Fifth Embodiment]—Method for Registering UTM/USS with the Core Network of a Wireless Communication System The disclosure includes a process for registering with a wireless communication system when a specific USS/UTM newly starts a service. In the first and second embodiments, a UAV/UAVC should be authenticated by the specific USS/UTM and requires a method for identifying the specific USS/UTM. Further, when a specific UAV transfers an authentication request, the AMF or SMF to process it should discover/select a USS/UTM capable of authenticating the UAV/UAVC. To address these issues, the disclosure includes a method for registering the USS/UTM with the core network of the wireless communication system to support authentication of the UAV/UAVC. The method of the disclosure is described in detail with reference to FIG. 7.

Figure 7:
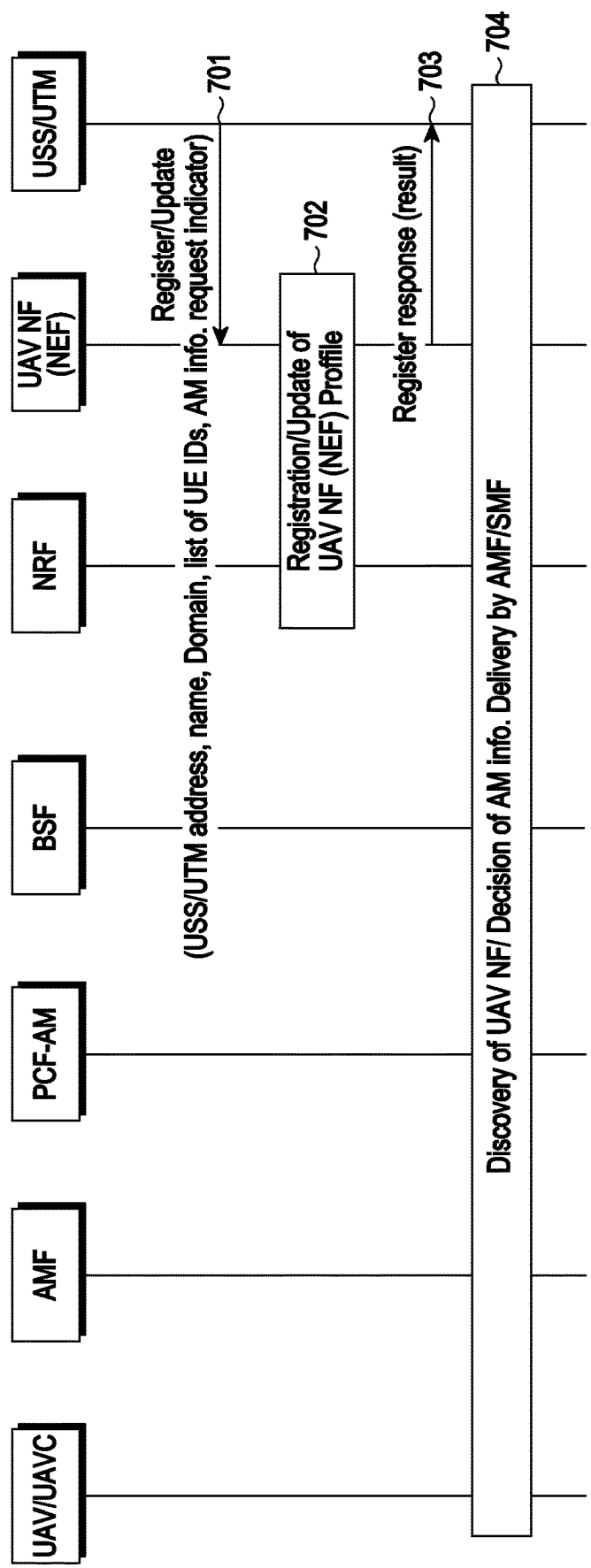
FIG. 7 is a flowchart illustrating a procedure in which a USS/UTM registers with a UAV NF in a wireless communication system according to an embodiment of the disclosure.

FIG. 7 is a flowchart illustrating a procedure in which a USS/UTM registers with a UAV NF in a wireless communication system according to an embodiment of the disclosure.

Referring to FIG. 7, in operation 701, if the USS/UTM newly starts a service or a new authentication server is introduced, it is supported to register it with the wireless communication system and allow a specific UAV/UAVC(s) to be authenticated. The USS/UTM requests registration by transferring, to the UAV NF (or NEF), the network address, name, and domain of the USS/UTM, information about the UAV/UAVC it manages, and whether mobility policy information about the UAV/UAVC is needed upon authentication.

In operation 702, the UAV NF (or NEF), receiving a request for registration from the USS/UTM, may register it with the NRF that it is able to support authentication of the UAV/UAVC and is able to proceed with authentication of the UAV/UAVC in relation to a specific domain or the list of UAVs/UAVCs received in operation 701. If the NRF is already registered, an update proceeds. When registered, the information additionally received in operation 701 may be included in the NFprofile. The service used for the UAV NF to register with the NRF may be Nnrf_NFManagement. For a basic description of the service, refer to the TS 23.502 standard.

In operation 703, the UAV NF responds to the USS/UTM, regarding whether registration of the corresponding USS/UTM succeeds or fails.

In operation 704, in a case where the registration of the UTM/USS is complete, if a specific UAV/UAVC requires authentication for flight, the SMF or AMF may discover the UAV NF supporting the USS/UTM where the UAV/UAVC should be authenticated, using the NF profile of the UAV NF received in operation 702. This process may be identical to the method described above in connection with the first or second embodiment.

[Sixth Embodiment]—Method for Obtaining Mobility Information about UAV/UAVC from AMF or PCF-AM and Transferring it to USS/UTM A UAV/UAVC using a 5G-based wireless communication system may be given authentication and authority related to use of the wireless communication system via a normal registration process. The normal registration process is a process for registering terminals, not the UAV/UAVC. The UAV/UAVC may further require authentication with the USS/UTM in addition to the authentication procedure for the regular terminal. In this case, the USS/UTM may be an AF or server located outside the wireless communication system. In the above-described registration process, the core network may support a process in which the UAV/UAVC is normally authenticated through the USS/UTM.

According to an embodiment, to perform an additional procedure for authentication of the UAV/UAVC in the USS/UTM located outside the wireless communication system, it is needed to select an entity for transferring the authentication-related data of the UAV/UAVC through the control plane of the wireless communication system and set a route. In this embodiment, there is included a method for transferring control information to perform authentication with the USS/UTM in additional to authenticating the UAV/UAVC as a regular terminal in the wireless communication system.

The UAV/UAVC may include information about the UAV/UAVC in addition to a PDU session establishment request during the PDU session establishment request to perform external authentication related to aviation. In this case, the UAV/UAVC may use a NAS-SM to send a request for establishing a PDU session to the core network of the wireless communication system, and the PDU session establishment request may be transferred to the SMF through the AMF. In this case, the AMF needs to select an SMF with the capability of performing authentication with the UTM. It may further be considered whether it is possible to establish a data transfer path with a specific USS/UTM during the course of selecting an SMF.

Upon receiving the PDU session establishment request, the AMF may be aware whether the request is a request for establishing a PDU session for the UAV/UAVC through a combination of the type of the container in the NAS message, the presence/absence of a container containing UAV/UAVC-related information, or whether there is a request for a specific DNN, S-NSSAI or a combination of whether UAV/UAVC information is included in the terminal's subscription information. In the disclosure, a method for transferring, to the USS/UTM, UAV/UAVC-related authentication data transferred from the UAV/UAVC for authentication of the UAV/UAVC and additional data related to UAV/UAVC operation is described in detail with reference to FIG. 8.

Figure 8:
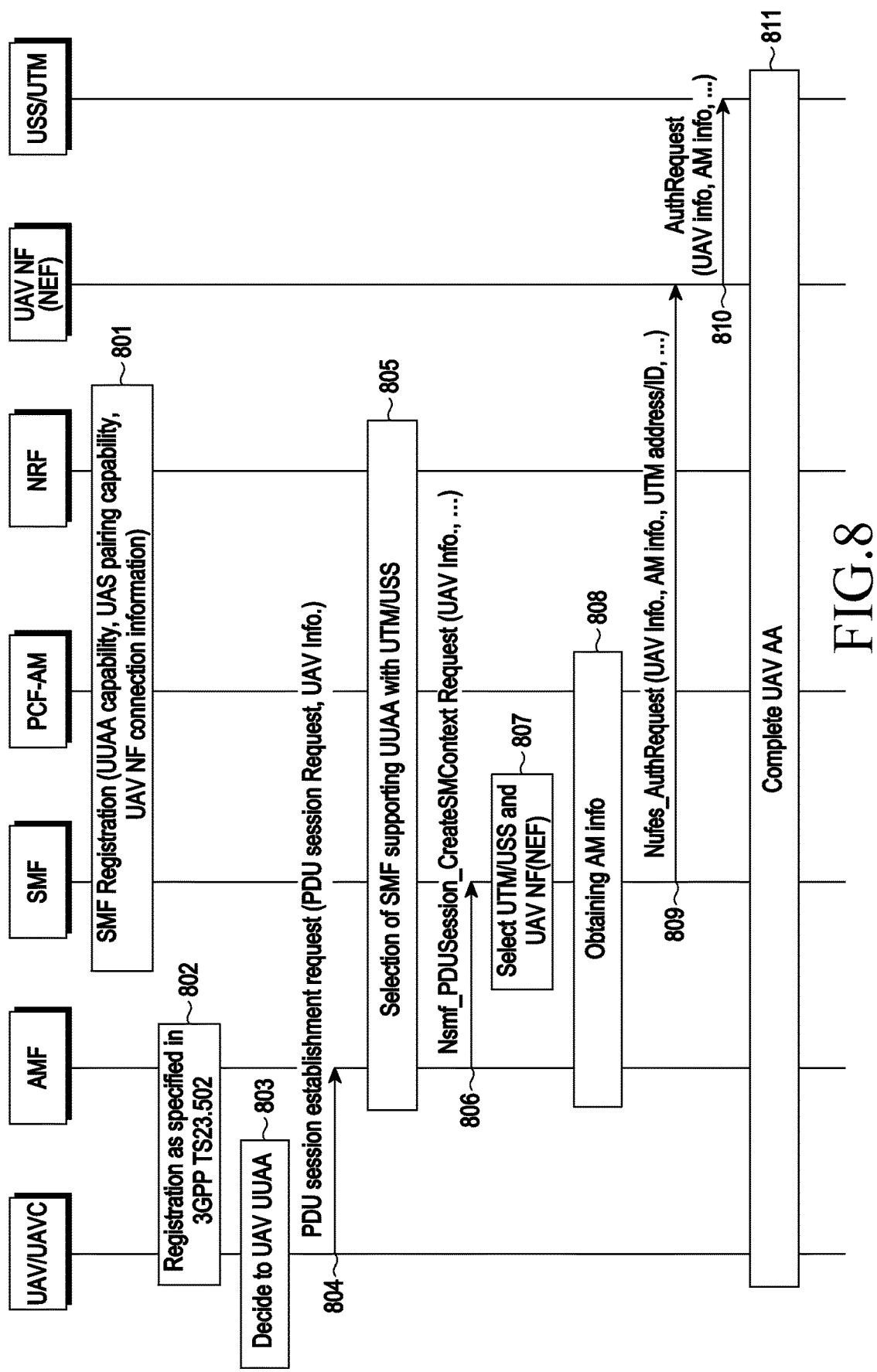
FIG. 8 is a flowchart illustrating an authentication-related procedure of a UAV/UAVC in a wireless communication system according to an embodiment of the disclosure.

FIG. 8 is a flowchart illustrating an authentication-related procedure of a UAV/UAVC in a wireless communication system according to an embodiment of the disclosure.

In operation 801, in the SMF executed or initialized state, the SMF registers related information with the NRF so as to allow another NF, e.g., AMF, to discover/detect the SMF. The information registered with the NRF may include at least one of information for NF management defined in the 3GPP standard, e.g., NF instance identifier, NF address or FQDN, and supported service name. In this process, the disclosure may further include whether the SMF supports an authentication-related service of the UAV/UAVC and list information about the connected UTM or USS addresses. For example, at least one of whether the SMF supports authentication with an external server through the SMF and UAV NF (NEF) for authentication of the UAV/UAVC (UUAA capability), whether the SMF supports closed communication with an authenticated terminal requested by a specific UAVC or UTM (UAS pairing capability), and address or name list of UTM/USS connected with the SMF (UAV NF information) may be stored in the NF profile of the corresponding SMF and registered with the NRF.

In operation 802, the UAV/UAVC performs a registration procedure in the wireless communication system. This process may be performed according to the terminal's normal registration procedure as defined in the 3GPP standard (TS 23.502).

In operation 803, the UAV/UAVC determines whether to perform authentication (e.g., UUAA) through the USS/UTM.

In operation 804, the UAV/UAVC transmits, to the AMF, a PDU session establishment request for establishing connection and authentication through the USS/UTM. The PDU session establishment request may be transferred using a NAS message. The NAS message used in this case may be a NAS-SM. In addition, in operation 804, the UAV/UAVC may include at least one of UAV operation-related information, e.g., the serial number of the UAV, the UAV unique identifier, the identifier/network address of the USS/UTM managing the UAV, flight time and route, and whether additional authentication is required. Further, in operation 304, according to an embodiment, the UAV/UAVC may additionally include information related to mobility restriction transferred in operation 802 in the NAS message and transfer it.

In operation 805, the AMF receiving the PDU session establishment request from the UAV/UAVC selects an SMF for processing the request. In this case, the disclosure may select an SMF using the information additionally included in operation 804, rather than selecting an SMF by referring to the previously requested S-NSSAI and DNN alone. The AMF may compare the information with the SMF-related information registered in operation 801 and discover an SMF that may meet the PDU session establishment request through the NRF. For example, the AMF may perform an SMF where the UAV/UAVC is able to perform an additional authentication-related function with the USS/UTM or an external AF through whether the additional authentication is needed. Further, the selected SMF may be an SMF supporting the USS UAV authentication/authorization (UUAA) to allow the UAV/UAVC to be registered and permitted with the USS/UTM through the wireless communication system. Further, the AMF may select an SMF supporting the corresponding USS/UTM (or the AF's address) more specifically, by using the address of the requested USS/UTM. In operation 805, if an SMF having connectivity with a specific USS/UTM may not be specified, an SMF may be selected using the process of the second embodiment.

In operation 806, if selection of an SMF to process the PDU session request is complete, the AMF transfers the NAS-SM message received from the UAV/UAVC in operation 804 to the selected SMF.

In operation 807, the SMF receiving the PDU session establishment request from the AMF determines whether to perform additional authentication on the UAV/UAVC with the USS/UTM based on the UAV/UAVC-related information additionally transferred from the UAV/UAVC and selects a UAV NF (NEF) for performing authentication on the UAV/UAVC with the USS/UTM using the address information about the USS/UTM.

In operation 808, the SMF selects a UAV NF (or NEF) supporting authentication to find the destination address of the USS/UTM and then identifies whether mobility policy-related information related to access-related information or mobility-restricted area is additionally required according to the configuration of the USS/UTM. Whether it is required to be determined according to the internal policy of the mobile communication operator or transferred at the time when the USS/UTM registers using the UAV NF. In this case, if such information is needed, the SMF receives related mobility information (AM information) from the AMF or PCF-AM. In this process, some embodiments may be used, and the Namf_EventExposure or Npcf_EventExposure service may be used, or a service newly defined to transfer mobility information may be used.

In operation 809, the SMF performs authentication with an external USS/UTM (or AF) according to the content of the message received from the UAV/UAVC. In this case, the SMF transfers the mobility-related information and authentication-related information, received from the UAV/UAVC through the UAV NF (or NEF), to the NEF. In this case, the UAV NF may transfer authentication-related information for additional authentication with the external entity, mobility restriction-related information, UTM identifier, or network address, and the service used at this time may be performed by invoking a new service interface provided by the NEF.

In operation 810, the NEF performs an authentication procedure on the UAV/UAVC with the USS/UTM (or AF) located outside, based on the information received from the SMF in operation 809. If additional information is needed in this process, exchange of an additional message with the UAV/UAVC may be performed using the NAS-SM message through the SMF.

In operation 811, the USS/UTM performs authentication on the UAV/UAVC based on the received USS/UTM and responds to the UAV NF (NEF), with the authentication result. The response result transferred to the UAV NF (NEF) may be transferred to the SMF and the UAV/UAVC (UAV authentication/authorization (AA)).

[Seventh Embodiment]—Method for Transferring UTM/USS Mobility-Related Requirements in the Authentication Process The disclosure includes a method for reestablishing a policy related to mobility by transferring, to the core network, mobility-related information while the USS/UTM performs authentication in a case where the policy of the wireless communication system related to the mobility of the UAV/UAVC does not match the requirements of the UAV/UAVC in the process of authentication of the UAV/UAVC. The mobility-related information may include at least one of the service or moving area of the UAV/UAVC and preferred radio access technology of the UAV/UAVC. The disclosure is described in detail with reference to FIGS. 9A and 9B.

Figure 9A:
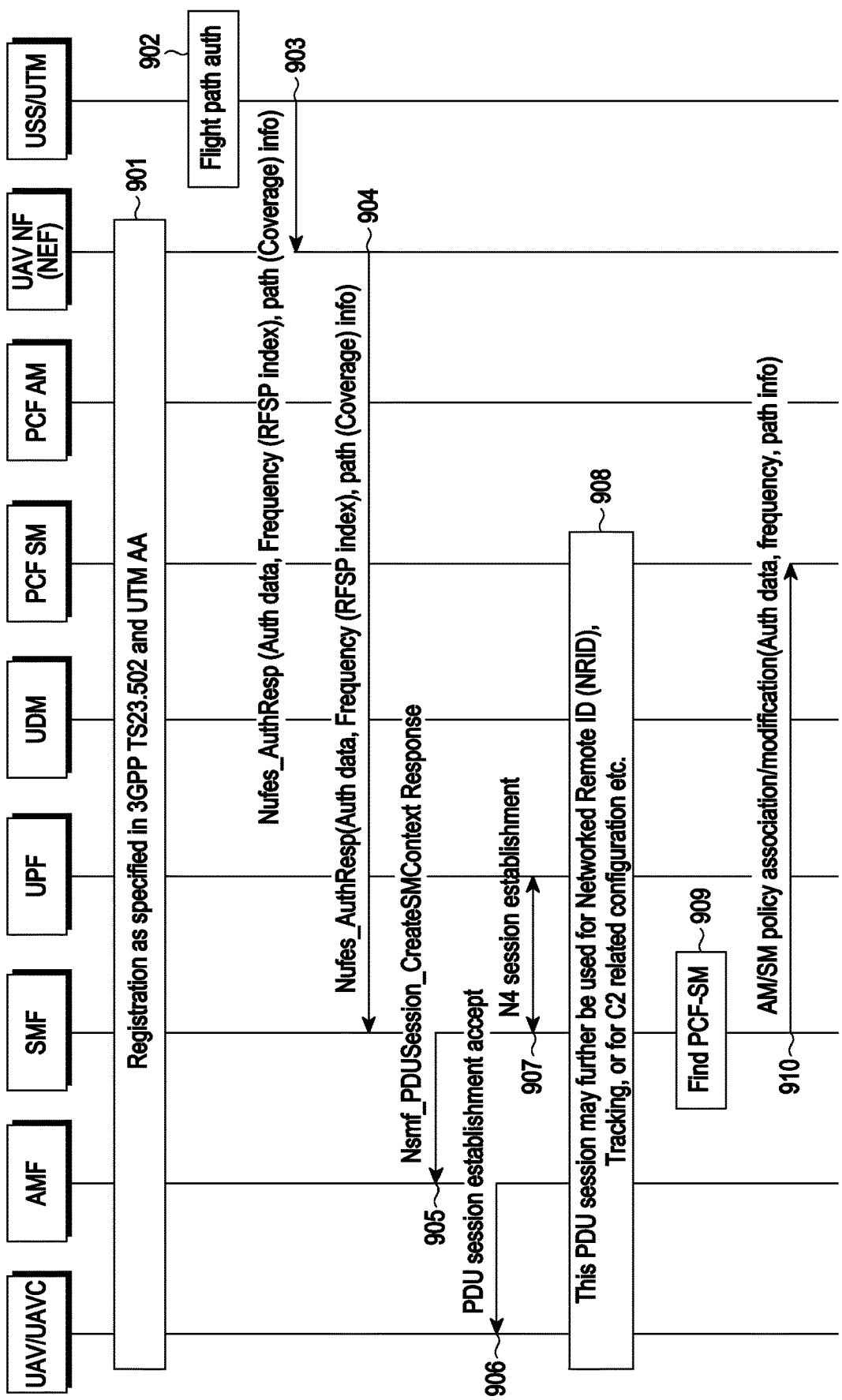
FIGS. 9A and 9B are flowcharts illustrating a policy update procedure after authentication of a UAV/UAVC in a wireless communication system according to various embodiments of the disclosure.
Figure 9B:
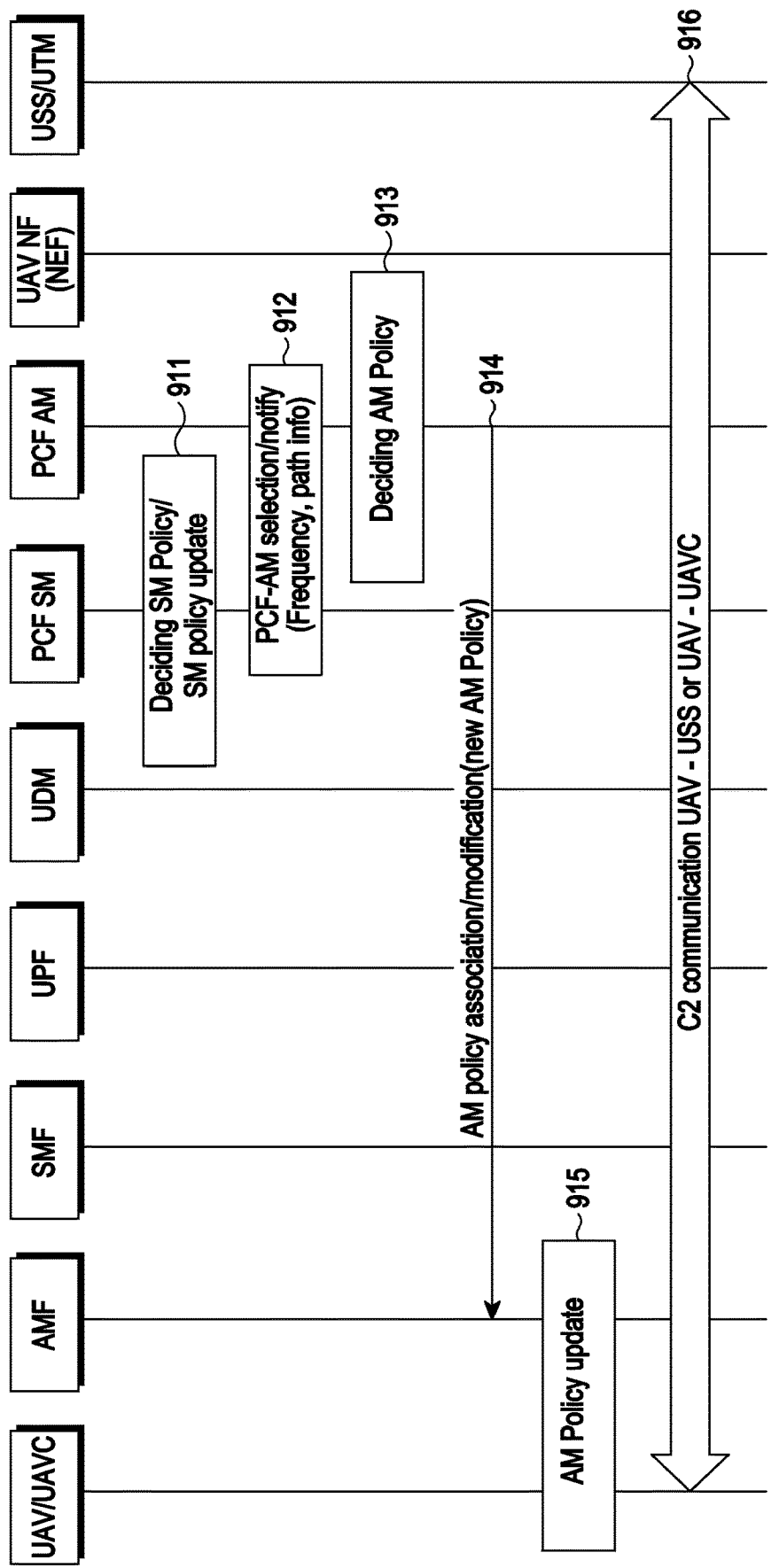

FIGS. 9A and 9B are flowcharts illustrating a policy update procedure after authentication of a UAV/UAVC in a wireless communication system according to various embodiments of the disclosure.

Referring to FIGS. 9A and 9B, in operation 901, the UAV/UAVC performs a regular terminal registration procedure defined in the 3GPP standard and requests to establish a PDU session for operation of the UAV/UAVC. Accordingly, an additional authentication procedure may occur between the SMF, UAV NF, and UTM/USS.

In operation 902, the UTM/USS may perform a process for authenticating the flight route of the UAV. In this operation, it determines that mobility-related policy, such as the mobility restricted area or radio access technology information provided in the 3GPP standard may differ from the requirements or may be enhanced.

In operation 903, the USS/UTM transfers, to the UAV NF, information about at least one of the service area or flight route and preferred radio access type (e.g., radio access technology (RAT)/frequency selection priority (RFSP) index) along with the result of authentication responsive to the authentication request of the UAV/UAVC. The service area or flight route of the UAV may be represented in diversified manners, such as a tracking area identity (TAI) list, cell list, or local coordinate information and, if receiving local information, the UAV NF (or NEF) performs conversion into the form, e.g., cell ID or TAI, processable in the NF defined in the 3GPP standard. The preferred radio access type may be represented in various manners, and various representations, such as ones focusing on data transmission, ones focusing on real-time streaming, ones focusing on surveillance, or ones focusing on low latency, are possible. In another embodiment, there may be a representation format of information according to a separate agreement between the mobile communication carrier and the USS/UTM, or a standardized preferred radio access type may be standardized in the form of indexes.

In operation 904, the UAV NF transfers the result of authentication of the USS/UTM on the UAV/UAVC to the SMF. In this process, the result of authentication may be transferred along with the external identifier (External ID) of the UAV/UAVC and civil aviation authority (CAA)-level identifier, and information about at least one of the service area or flight route and preferred radio access type (e.g., RFSP index), along with the result of authentication, may be transferred. The UAV NF may internally store the authentication information transferred to the SMF in operation 904 or may transfer the authentication information to the UDR. The stored information may be used later by the PCF-AM or PCF-SM.

In operations 905, 906 and 907, the SMF, receiving the information including the result of authentication from the UAV NF, transfers information about whether to process the PDU session establishment request according to the result of authentication, to the UAV/UAVC. Operations 905, 906 and 907 follow the PDU session establishment procedure as set forth in the 3GPP standard. Further, for a basic description of messages transmitted/received for the PDU session establishment procedure in the 3GPP standard in the above-described embodiments, TS 23.502 may be referenced.

In operation 908, for the PDU session, it is possible to modify information for managing the PDU session, such as whether only connection with an external node, such as a specific terminal (e.g., UAV/UAVC), is supported according to the result of authentication. For example, the PDU session may include changing the user path (N4 session) for supporting closed communication with the UAV/UAVC when it is authenticated through the UTM/USS and, in this case, pairing with the UAV/UAVC occurs. In operations 909 and 910, the SMF transfers, to the PCF-SM, information about at least one of mobility-related information, UAS pairing information (permitting communication with a specific network address), the result of authentication of a specific UAV/UAVC from the result of authentication. The information about at least one of the service area or flight route and preferred radio access type (e.g., RFSP index) along with the result of authentication may be transferred to the PCF-SM. In operation 911, the PCF-SM updates the session-related policy to reflect such matters as the QoS requirements related to the PDU session and the UAS pairing information based on the information received from the SMF. In this process, the mobility-related matter information may be transferred to the PCF-AM, and the process of discovering the PCF-AM may use the binding support function (BSF) or follow the procedure defined in the 3GPP standard. In operation 912, the PCF-SM may transfer, to the PCF-AM, information about at least one of the service area or flight route and preferred radio access type (e.g., RFSP index). If the PCFSM is the same as the PCF-AM or the SMF is already aware of the PCF-AM, only mobility-related information may be transferred to the PCF-AM, or operations 909 to 911 may be omitted. To reflect the session and mobility-related information received from the UTM/USS, the PCF-SM and the PCF-AM update/determine related policies (e.g., determine the RFSP index and service area restriction (SAR)) and transfer rules related to a new policy to the AMF and the SMF in operations 913 and 914. The SAR means an area where communication of the UAV/UAVC is permitted and may be understood as a mobility restriction for the UAV/UAVC.

In operation 915, if the mobility-related policy of the UAV/UAVC needs to be updated, the mobility-related factors of the UAV/UAVC may be reflected using the terminal configuration update procedure defined in the 3GPP standard.

Thereafter, in operation 916, the UAV/UAVC may use an unmanned aerial service.

Figure 10:
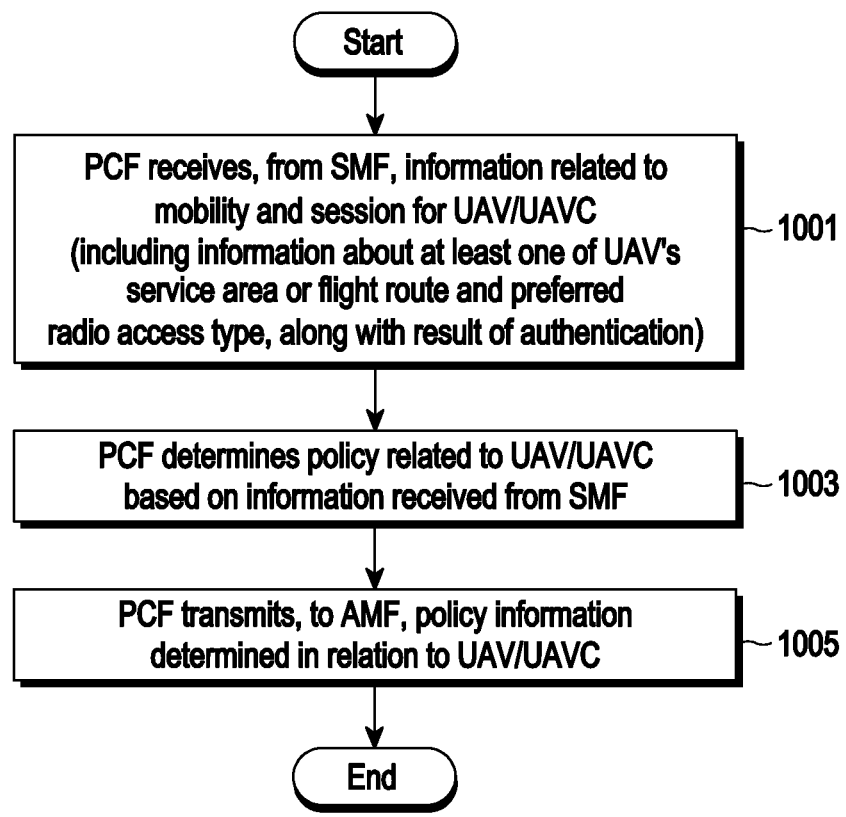
FIG. 10 is a flowchart illustrating operations of a PCF in an authentication-related procedure of a UAV/UAVC according to an embodiment of the disclosure.

FIG. 10 is a flowchart illustrating operations of a PCF in an authentication-related procedure of a UAV/UAVC according to an embodiment of the disclosure. The PCF of FIG. 10 corresponds to the PCF-SM or PCF-AM in the embodiments of FIGS. 9A and 9B.

Referring to FIG. 10, in operation 1001, the PCF receives, from the SMF, session and mobility-related information about the UAV/UAVC (including information about at least one of the service area or flight route and preferred radio access type of the UAV, along with the result of authentication). In operation 1003, the PCF determines a policy related to the UAV/UAVC based on the information received from the SMF. In operation 1005, the PCF transmits policy information determined in relation to the UAV/UAVC to the AMF.

Figure 11:
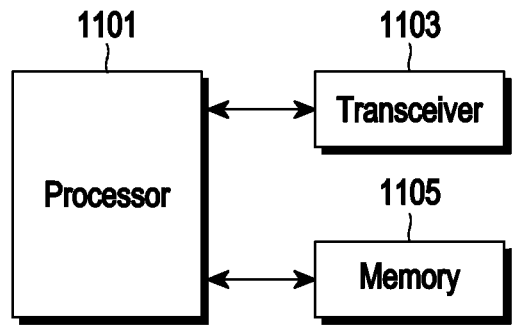
FIG. 11 is a view illustrating a configuration of a terminal according to an embodiment of the disclosure.

FIG. 11 is a view illustrating a configuration of a terminal according to an embodiment of the disclosure.

Referring to FIG. 11, according to an embodiment, a terminal including a UAV/UAVC may include a processor 1101 controlling the overall operation of the terminal, a transceiver 1103 including a transmitter and a receiver, and a memory 1105.

Without limited thereto, the terminal may include more or less components than those shown in FIG. 11.

According to an embodiment, the transceiver 1103 may transmit/receive signals to/from network entities or another terminal exemplified in at least one embodiment among the embodiments of FIGS. 1, 2, 3, 4A and 4B, 5, 6, 7, 8, and 9A and 9B. The signals transmitted/received with the network entity may include control information and data. The transceiver 1103 may receive signals via a radio channel, output the signals to the processor 1101, and transmit signals output from the processor 1101 via a radio channel.

According to an embodiment, the processor 1101 may control the terminal to perform any one operation of the embodiments described above in connection with FIGS. 1, 2, 3, 4A and 4B, 5, 6, 7, 8, and 9A and 9B. The processor 1101, the memory 1105, and the transceiver 1103 are not necessarily implemented in separate modules but rather as a single component, e.g., a single chip. The processor 1101 and the transceiver 1103 may be electrically connected with each other. The processor 1101 may be an application processor (AP), a communication processor (CP), a circuit, an application-specific circuit, or at least one processor. The transceiver 1103 may be a transceiver transmitting/receiving signals through a wireless network.

According to an embodiment, the memory 1105 may store a default program for operating the terminal, application programs, and data, such as configuration information. The memory 1105 provides the stored data according to a request of the processor 1101. The memory 1105 may include a storage medium, such as read only memory (ROM), random access memory (RAM), hard disk, compact disc ROM (CD-ROM), and digital versatile disc (DVD), or a combination of storage media. There may be provided a plurality of memories 1105. The processor 1101 may perform the above-described embodiments based on a program for performing at least one or a combination of the above-described embodiments stored in the memory 1105.

Figure 12:
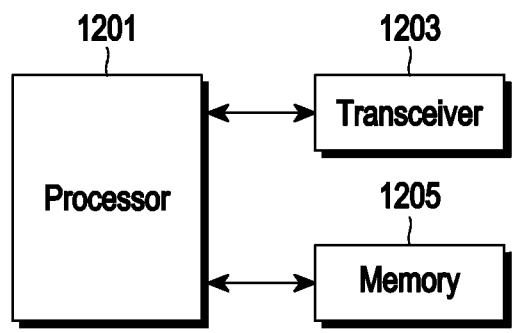
FIG. 12 is a view illustrating a configuration of a network entity according to an embodiment of the disclosure.

FIG. 12 is a view illustrating a configuration of a network entity according to an embodiment of the disclosure.

The network entity of FIG. 12 may be one of the network functions (NFs), such as the PCF, USS/UTM, SMF, and AMF, described above in connection with FIGS. 1, 2, 3, 4A and 4B, 5, 6, 7, 8, and 9A and 9B.

Referring to FIG. 12, according to an embodiment, the network entity may include a processor 1201 controlling the overall operation of the terminal, a transceiver 1203 including a transmitter and a receiver, and a memory 1205.

Without limited thereto, the network entity may include more or less components than those shown in FIG. 12.

According to an embodiment, the transceiver 1203 may transmit/receive signals to/from at least one of other network entities or a terminal including a UAV/UAVC. The signals transmitted/received with at least one of the other network entities or the terminal may include control information and data.

According to an embodiment, the processor 1201 may control the network entity to perform an operation of any one or combination of the embodiments described above in connection with FIGS. 1, 2, 3, 4A and 4B, 5, 6, 7, 8, and 9A and 9B. The processor 1201, the memory 1205, and the transceiver 1203 are not necessarily implemented in separate modules but rather as a single component, e.g., a single chip. The processor 1201 and the transceiver 1203 may be electrically connected with each other. The processor 1201 may be an application processor (AP), a communication processor (CP), a circuit, an application-specific circuit, or at least one processor. The transceiver 1203 may include a communication interface for wiredly/wirelessly transmitting/receiving signals to/from another network entity.

According to an embodiment, the memory 1205 may store a default program for operating the network entity, application programs, and data, such as configuration information. The memory 1205 provides the stored data according to a request of the processor 1201. The memory 1205 may include a storage medium, such as ROM, RAM, hard disk, CD-ROM, and DVD, or a combination of storage media. There may be provided a plurality of memories 1205. The processor 1201 may perform the above-described embodiments based on a program for performing the above-described embodiments stored in the memory 1205.

It should be noted that the above-described configuration views, example views of control/data signal transmission methods, example views of operational procedures, and configuration views are not intended as limiting the scope of the disclosure. In other words, all the components, entities, or operational steps described in connection with the embodiments should not be construed as essential components to practice the disclosure, and the disclosure may be rather implemented with only some of the components without departing from the gist of the disclosure. The embodiments may be practiced in combination, as necessary. For example, some of the methods proposed herein may be combined to operate the network entity and the terminal.

The above-described operations of the base station or terminal may be realized by equipping a memory device retaining their corresponding codes in the base station device or any component of the terminal device. That is, the controller in the eNB or terminal may execute the above-described operations by reading and executing the program codes stored in the memory device by a processor or central processing unit (CPU).

As described herein, various components or modules in the entity, base station or terminal may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICS.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments via an external port. A separate storage device over the communication network may be connected to the device that performs embodiments.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments have been described above, various changes may be made thereto without departing from the scope of the disclosure. Thus, the scope of the disclosure should not be limited to the above-described embodiments, and should rather be defined by the following claims and equivalents thereof. In other words, it is apparent to one of ordinary skill in the art that various changes may be made thereto without departing from the scope of the disclosure. Further, the embodiments may be practiced in combination. For example, some of the methods proposed herein may be combined to operate the base station and the terminal. Although the embodiments are proposed in association with 5G and NR systems, various modifications thereto may apply to other various systems, such as LTE, LTE-advanced (LTE-A), LTE-A-Pro systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network exposure function (NEF) in a wireless communication system supporting authentication of an unmanned aerial system (UAS) including at least one of an unmanned aerial vehicle (UAV) or an unmanned aerial vehicle controller (UAVC), the method comprising:

receiving a mobility-related request for the UAS from an UAS service supplier (USS) or an unmanned aerial traffic management (UTM) requested for flight path authorization of the UAS;

identifying a network entity managing first mobility-related information of the UAS based on identification information of the UAS;

receiving the first mobility-related information of the UAS from the identified network entity; and transmitting, to the USS or the UTM, second mobility-related information obtained from the first mobility-related information of the UAS, the second mobility-related information being used for the flight path authorization of the UAS.

2. The method of claim 1, further comprising:
converting an external identifier of the UAS into an internal identifier of the UAS, the internal identifier being the identification information of the UAS, wherein the mobility-related request includes the external identifier of the UAS, wherein the external identifier includes a civil aviation authority (CAA)-level identifier of the UAS, and wherein the internal identifier includes a 5G subscription permanent identifier (SUPI) as subscriber concealed ID.

3. The method of claim 1,
wherein the first mobility-related information includes at least one of information on a mobility-restricted area or information on a currently assigned radio access technology (RAT)/frequency selection priority (RFSP) index, and
wherein the information on the mobility-restricted area is represented as a list of service-prohibited areas or a list of service-permitted areas.

4. The method of claim 3, further comprising:
converting the first mobility-related information into the second mobility-related information,
wherein the second mobility-related information includes at least one of first information on a local area or second information on a RAT type and a frequency band currently used by the UAS,
wherein the first information is converted from a tracking area ID (TAI) which is area information represented in the wireless communication system, and
wherein the second information is converted from a currently assigned RFSP index.

5. The method of claim 1, wherein the network entity managing the first mobility-related information is either an access and mobility management function (AMF) or a policy control function-access and mobility (PCF-AM).

6. A network exposure function (NEF) in a wireless communication system supporting authentication of an unmanned aerial system (UAS) including at least one of an unmanned aerial vehicle (UAV) or an unmanned aerial vehicle controller (UAVC), the NEF comprising:
a transceiver; and
a processor configured to:
receive, through the transceiver, a mobility-related request for the UAS from an UAS service supplier (USS) or an unmanned aerial traffic management (UTM) requested for flight path authorization of the UAS,
identify a network entity managing first mobility-related information of the UAS based on identification information of the UAS,
receive, through the transceiver, the first mobility-related information of the UAS from the identified network entity, and
transmit, to the USS or the UTM through the transceiver, second mobility-related information obtained from the first mobility-related information of the UAS, the second mobility-related information being used for the flight path authorization of the UAS.

7. The NEF of claim 6, further comprising:
converting an external identifier of the UAS into an internal identifier of the UAS, the internal identifier being the identification information of the UAS,
wherein the mobility-related request includes the external identifier of the UAS,
wherein the external identifier includes a civil aviation authority (CAA)-level identifier of the UAS, and
wherein the internal identifier includes a 5G subscription permanent identifier (SUPI) as subscriber concealed ID.

8. The NEF of claim 6,
wherein the first mobility-related information includes at least one of information on a mobility-restricted area or information on a currently assigned radio access technology (RAT)/frequency selection priority (RFSP) index, and
wherein the information on the mobility-restricted area is represented as a list of service-prohibited areas or a list of service-permitted areas.

9. The NEF of claim 8, the processor is further configured to convert the first mobility-related information into the second mobility-related information,
wherein the second mobility-related information includes at least one of first information on a local area or second information on a RAT type and a frequency band currently used by the UAS,
wherein the first information is converted from a tracking area ID (TAI) which is area information represented in the wireless communication system, and
wherein the second information is converted from a currently assigned RFSP index.

10. The NEF of claim 6, wherein the network entity managing the first mobility-related information is either an access and mobility management function (AMF) or a policy control function-access and mobility (PCF-AM).

* * * * *